US012577353B2

(12) United States Patent
Chernyshov et al.

(10) Patent No.: US 12,577,353 B2
(45) Date of Patent: Mar. 17, 2026

(54) ASPARTIC ACID ESTER-FUNCTIONAL POLYSILOXANES, THEIR PREPARATION AND USE THEREOF

(71) Applicant: Momentive Performance Materials GmbH, Leverkusen (DE)

(72) Inventors: Dmitry Chernyshov, Rimpar (DE); Ping Jiang, New City, NY (US); Louisa Maio, White Plains, NY (US)

(73) Assignee: Momentive Performance Materials GmbH, Leverkusen (DE)

( * ) Notice: Subject to any disclaimer, the term of this patent is extended or adjusted under 35 U.S.C. 154(b) by 517 days.

(21) Appl. No.: 18/108,079

(22) Filed: Feb. 10, 2023

(65) Prior Publication Data

US 2023/0312834 A1 Oct. 5, 2023

Related U.S. Application Data

(60) Provisional application No. 63/309,693, filed on Feb. 14, 2022.

(51) Int. Cl.

*C08G 77/26* (2006.01)
*C08G 77/388* (2006.01)

(52) U.S. Cl.

CPC .......... *C08G 77/26* (2013.01); *C08G 77/388* (2013.01)

(58) Field of Classification Search

CPC .............................. C08G 77/26; C08G 77/388
USPC .......................................................... 525/479
See application file for complete search history.

(56) References Cited

U.S. PATENT DOCUMENTS

| | | | | |
|---|---|---|---|---|
| 6,664,342 | B1 | 12/2003 | Koehler et al. | |
| 11,542,369 | B2 * | 1/2023 | Chernyshov | C08G 18/6225 |
| 2021/0363307 | A1 * | 11/2021 | Chernyshov | C08G 18/61 |

FOREIGN PATENT DOCUMENTS

| | | | | |
|---|---|---|---|---|
| WO | WO-2020079097 A1 * | 4/2020 | | C09D 175/02 |

* cited by examiner

*Primary Examiner* — Deve V Hall
(74) *Attorney, Agent, or Firm* — Dilworth & Barrese, LLP

(57) ABSTRACT

The present invention relates to new aspartic acid ester-functional polysiloxanes, their use in the manufacture of curable compositions using polyisocyanate crosslinkers, in particular, in the manufacture of coating compositions, cured compositions obtained from said curable compositions and articles comprising the cured compositions.

20 Claims, No Drawings

ASPARTIC ACID ESTER-FUNCTIONAL POLYSILOXANES, THEIR PREPARATION AND USE THEREOF

FIELD OF INVENTION

The present invention relates to new aspartic acid ester-functional polysiloxanes, their use in the manufacture of curable compositions using polyisocyanate crosslinkers, in particular, in the manufacture of coating compositions, cured compositions obtained from said curable compositions and articles comprising the cured compositions. In particular the present invention discloses the use of the new silicone aspartic acid ester-functional polysiloxanes as a release coating additive for solvent-based and water-based organic coating systems. The invention can be particularly useful for the formulation of durable antigraffiti and easy-to-clean coating systems for outdoor use.

BACKGROUND OF THE INVENTION

Silicone oils and modified polysiloxanes find numerous applications in coatings industry. For example, the use of such products as flow and levelling additives, defoamers, slip additive, anti-blocking, wetting and release agents is describe in "BASF Handbook on Basics of Coating Technology" by Artur Goldschmidt, Hans-Joachim Streitberger; Vincentz Network, Primedia, Hannover, Germany, ISBN: 87870-798-3. It is known from the art that silicone-based materials can be used as additives for the formulation of antigraffiti coating systems and coating systems with easy-to-clean effect. EP1193303; EP3023467; US2020283558 describe silicone structures that can be used as functional modifiers to enhance release and anti-staining properties of organic coatings. Traditionally, silicone materials used in such applications are polysiloxane block-co-polymers containing pendant or main-chain organic backbones.

Incorporation of organic polymer backbone into the polysiloxane structure helps to improve compatibility of base silicone material with the organic coating matrix. Examples of such hybrid polymers include but not limited to polysiloxane-polyethers, polysiloxane-polyacrylates, polysiloxane-polyepoxides, polysiloxane-polyacrylates etc. One of the disadvantages of the polysiloxane block-copolymer is that organic polymer backbones can undergo gradual deterioration upon outdoor exposure, which can adversely affect release properties of the silicone material.

Polysiloxane backbones modified with aspartic ester groups are known in the art. For example, US2016/0009971, CN104312398, and CN112250868A, disclose aspartic polysiloxane structures prepared by reacting alpha, omega-bis (3-aminopropylsiloxane) containing terminal aminogroups with diethylmaleate. U.S. Pat. No. 6,664,342 B1 discloses product prepared by reacting diethyl maleate with long-chain PDMS equilibrated with aminosilane. WO2020079097 discloses aspartic polysiloxane structures with alkoxysilane (—OMe)x and (—OEt)x functionality synthesized by esterification of Si—OH functional fluid with corresponding aminosilanes. The aspartic acid ester-functional polysiloxane according to WO2020079097 have sufficient reactivity and pot-life in polyisocyanate-based curing compositions, and are compatible with polyurea and/or polyurethane coating compositions and allows for improved bending flexibility, impact resistance, elongation and chemical resistance, and corrosion resistance to metal substrates. WO2020079097 is however silent about the use of the aspartic acid ester-functional polysiloxanes as a release agent and antigraffiti additive in particular for water-based organic coating system.

SUMMARY OF THE INVENTION

Thus, the object of the current invention is a silicone modified aspartic ester that can provide good compatibility with organic coating matrix and simultaneously provide a more durable release, antigraffiti effect. More specifically the object of the present invention is to provide a silicone-aspartic copolymer as described below and its application in particular as a release agent and antigraffiti coating additive for water- or solvent-based organic coating systems. It is a further object of the present invention to provide an oil-in-water emulsion of said silicone-aspartic copolymer and how such emulsion can be used as a release agent and antigraffiti additive for solvent or water-based organic coating systems preferably water-based organic coating systems. The aspartic acid ester-functional polysiloxanes can also impart for example UV-, water-, chemical, and thermal resistance, as well as flexibility, and adhesive properties to polymeric compositions, such as organic coating systems.

In accordance with the present invention there is provided a polyorganosiloxane (I) comprising at least one unit of the formula (A):

(A)

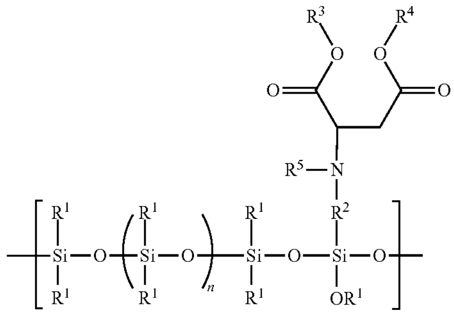

and at least one unit of the formula (B):

(B)

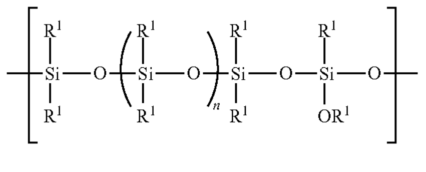

and wherein the terminal units of said polyorganosiloxane are selected of the formulas (C) and (D):

(C)

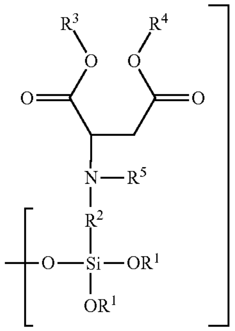

and (D)

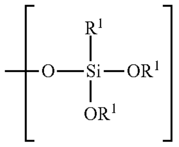

these units (A) to (D) being connected to each other in such a way that Si—O—Si bonds are formed between them, wherein each n is an average number of about 1 to 250, preferably 1 to 100, more preferably 1 to 40, more preferably 1 to 30; more preferably 1 to 20, and most preferably 2 to 10, or each n is an average number of about 1 to 40, preferably 1 to 30; more preferably 1 to 20, still more preferably 2 to 10, still more preferably 3 to 9, still more preferably 3 to 8, most preferably 4 to 7, each $R^1$ is independently selected from organic groups, preferably selected from aliphatic or aromatic groups, more preferably selected from an n-alkyl, iso-alkyl, or tertiary alkyl having up to 30 carbon atoms, an alkoxyalkyl having up to 30 carbon atoms, cycloalkyl having from 5 to 30 carbon atoms, an aryl having from 6 to 30 carbon atoms, an alkylaryl having from 7 to 30 carbon atoms, which groups can be substituted in addition by one or more oxygen, nitrogen, sulfur and/or fluorine atoms, or poly($C_2$-$C_4$)-alkylene ethers with up to 500 alkylene oxy units, the groups $R^1$ being free of aliphatic unsaturation, preferably $R^1$ is a monovalent hydrocarbon radical including alkyl radicals, such as $CH_3$—, $CH_3CH_2$—, $CH_3CH_2CH_2$—, $(CH_3)_2CH$—, $C_8H_{17}$— and $C_{10}H_{21}$—, cycloaliphatic radicals including cyclohexylethyl, aryl radicals including phenyl, tolyl, xylyl, aralkyl radicals including benzyl and 2-phenylethyl, monovalent halohydrocarbon radicals have the formula $C_mF_{2m+1}CH_2CH_2$— wherein m has a value of from 1 to 10, including $CF_3CH_2CH_2$—, $C_4F_9CH_2CH_2$—, $C_6F_{13}CH_2CH_2$—, or halohydrocarbon radicals substituted with an oxygen including $C_2F_5$—$O(CF_2$—$CF_{2-10})_{1-10}CF_2$—, $F[CF(CF_3)$—$CF_2$—$O]_{1-5}$—$(CF_2)_{0-2}$—, $C_3F_7$—$OCF(CF_3)$— and $C_3F_7$—$OCF(CF_3)$—$CF_2$—$OCF(CF_3)$—, more preferably $R^1$ is a methyl or phenyl, and most preferably $R^1$ is methyl, each $R^2$ is independently selected from the group consisting of a straight chain alkylene group having from 1 to 10 carbon atoms, branched chain alkylene group having from 3 to 10 carbon atoms, a cycloalkylene group having from 3 to 10 carbon atoms, an arylene group having from 6 to 12 carbon atoms, an aralkylene group having from 7 to 10 carbon atoms and an arenylene group having from 7 to 10 carbon atoms, preferably methylene, propylene, 2-methylbutylene and 2,2-dimethylbutylene and more preferably a branched chain alkylene group having from 3 to 10 carbon atoms, such as 2,2-dimethylbutylene bound in particular to the Si and N atoms as shown schematically below:

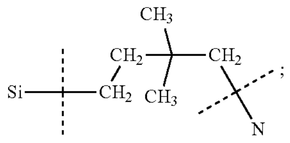

each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms, and $R^5$ is selected from the group consisting of hydrogen, and a group of the formula:

$$—R^6—Si(OR^1)_x(R)_{3-x}^1$$

wherein x is 1 to 3, preferably 3, each $R^1$ is independently selected from organic groups as defined above, and $R^6$ is an alkylene group which is bond via carbon atoms to the silicon atom and the nitrogen atom, and which can be substituted by oxygen (to form a carbonyl group) or in which one or more carbon atoms can be replaced by one or more of the group consisting of —O—, —S—, —NH— and —$NR^7$—, wherein $R^7$ represents an alkyl group.

In an embodiment of the invention $R^5$ is hydrogen.

DETAILED DESCRIPTION OF THE PREFERRED EMBODIMENTS OF THE INVENTION

In the specification and claims herein, the following terms and expressions are to be understood as indicated.

The singular forms "a," "an," and "the" include the plural, and reference to a particular numerical value includes at least that particular value, unless the context clearly dictates otherwise.

Other than in the working examples or where otherwise indicated, all numbers expressing amounts of materials, reaction conditions, time durations, quantified properties of materials, and so forth, stated in the specification and claims are to be understood as being modified in all instances by the term "about".

All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

The terms, “comprising,” “including,” “containing,” “characterized by,” and grammatical equivalents thereof are inclusive or open-ended terms that do not exclude additional, unrecited elements or method steps, but will also be understood to include the more restrictive terms “consisting of” and “consisting essentially of.”

It will be understood that any numerical range recited herein includes all sub-ranges within that range and any combination of the various endpoints of such ranges or sub-ranges.

As used herein, integer values of stoichiometric subscripts refer to molecular species and non-integer values of stoichiometric subscripts refer to a mixture of molecular species on a molecular weight average basis, a number average basis or a mole fraction basis.

In the description that follows, all weight percents are based upon total weight percent of the organic material(s) unless stated otherwise and all ranges given herein comprise all subranges therebetween and any combination of ranges and/or subranges therebetween.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

The expression “hydrocarbon group” or “hydrocarbon radical” means any hydrocarbon composed of hydrogen and carbon atoms from which one or more hydrogen atoms has been removed and is inclusive of alkyl, alkenyl, alkynyl, cycloalkyl, cycloalkenyl, cycloalkynyl, aryl, aralkyl and arenyl groups.

Groups can be composed of hydrocarbon groups containing at least one heteroatom and more specifically, a hydrocarbon group containing at least one heteroatom of oxygen, nitrogen or sulfur.

The term “alkyl” means any monovalent, saturated straight chain or branched chain hydrocarbon group; the term “alkenyl” means any monovalent straight chain or branched chain hydrocarbon group containing one or more carbon-carbon double bonds where the site of attachment of the group can be either at a carbon-carbon double bond or elsewhere therein; and, the term “alkynyl” means any monovalent straight chain or branched chain hydrocarbon group containing one or more carbon-carbon triple bonds and, optionally, one or more carbon-carbon double bonds, where the site of attachment of the group can be either at a carbon-carbon triple bond, a carbon-carbon double bond or elsewhere therein. Examples of alkyls include methyl, ethyl, propyl and isobutyl. Examples of alkenyls include vinyl, propenyl, allyl, methallyl, ethylidenyl norbornane, ethylidene norbornyl, ethylidenyl norbornene and ethylidene norbornenyl. Examples of alkynyls include acetylenyl, propargyl and methylacetylenyl.

As used herein, the siloxy units may use the shorthand notation for convenience. The shorthand notation is: M which represents $R_3SiO_{1/2}$, a monofunctional unit; D which represents $R_2SiO_{2/2}$, a difunctional unit; T which represents $RSiO_{3/2}$, wherein R is an organic group having the same exemplifications as $R^1$ except the polyorganosiloxanyl residue, a trifunctional unit; and Q, which represents $SiO_{4/2}$, a quadrifunctional (or tetrafunctional) unit. The notation follows the generally applied nomenclature of polyorganosiloxanes (see for example, Walter Noll, Chemistry and Technology of Silicones, page 3, Elsevier, 2012).

In an embodiment, the polyorganosiloxane (1) according to invention comprises at least one unit of the formula (A):

(A)

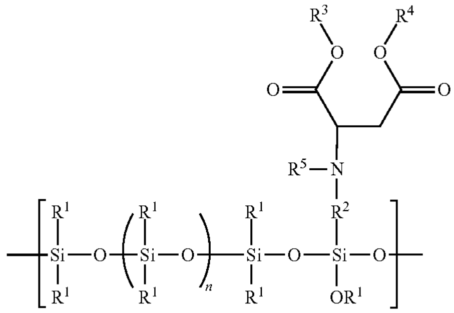

and at least one unit of the formula (E):

(B)

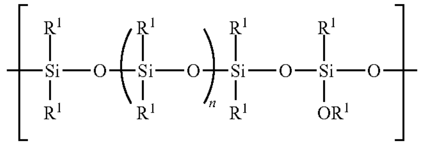

and wherein the terminal units of said polyorganosiloxane are selected of the formulas (C) and (F):

(C)

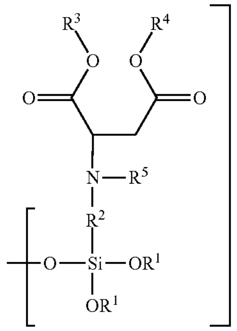

and (F)

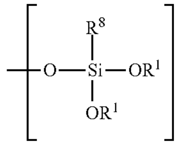

these units (A), (C), (E) and (F) being connected to each other in such a way that Si—O—Si bonds are formed between them, wherein n is as defined above, x is as defined above, $R^1$ to $R^7$ are each as defined above, and $R^8$ is selected from groups $R^1$ with the proviso that at least one of $R^8$ represents an epoxy functional group. Optionally all groups $R^8$ represents an epoxy functional group.

Preferably $R^8$ is an alkyl group comprising one or more, preferably one—O— (oxygen) and one or more, preferably one epoxy group of the formula:

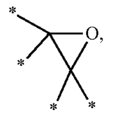

wherein the asterisks each denote a single bond to hydrogen or to the alkyl group, more preferably the epoxy group is of the formula

wherein the asterisk denotes a single bond to the alkyl group, and most preferably $R^8$ is represented by the formula

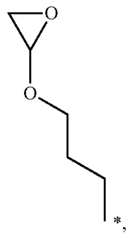

wherein the asterisk denotes a single bond to the silicon atom.

Other groups $R^8$ include e.g. 2-(3,4-epoxycyclohexyl) ethyl or-propyl:

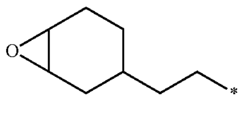

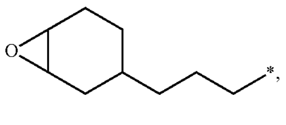

wherein the asterisk denotes a single bond to the silicon atom, and corresponding epoxy-functional trialkoxysilanes as starting materials are commercially available.

In an embodiment the polyorganosiloxane (1) according to invention comprises at least one unit of the formula (A):

(A)

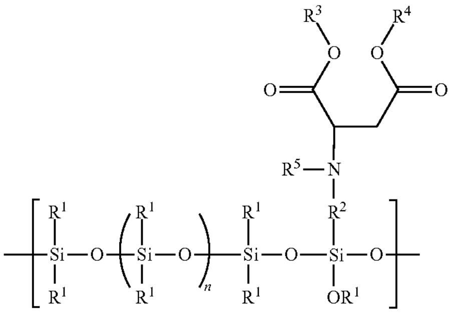

and at least one unit of the formula (G):

(G)

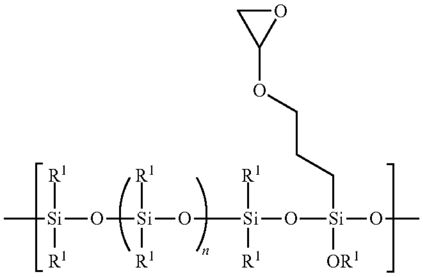

and wherein the terminal units of said polyorganosiloxane are selected of the formulas (C) and (H):

(C)

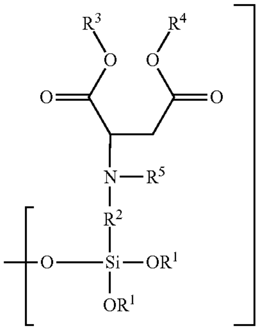

and

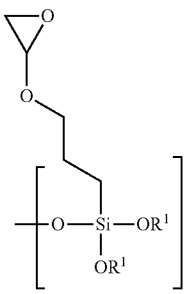

(H)

these units (A), (C), (G) and (H) being connected to each other in such a way that Si—O—Si bonds are formed between them, wherein n is as defined above, x is as defined above, and $R^1$ to $R^7$ are each as defined above.

In a preferred embodiment the polyorganosiloxane (1) according to invention comprises at least one group selected from the formula:

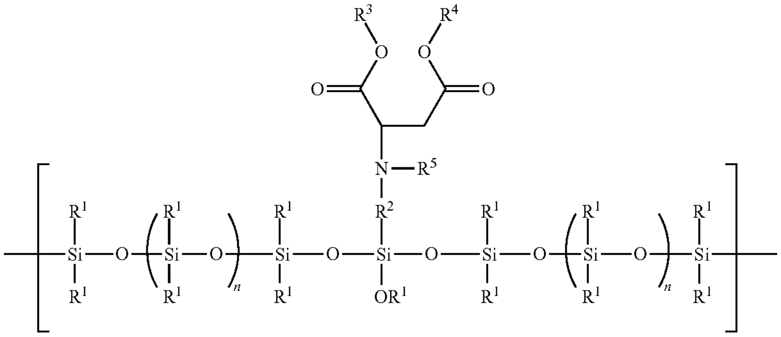

and

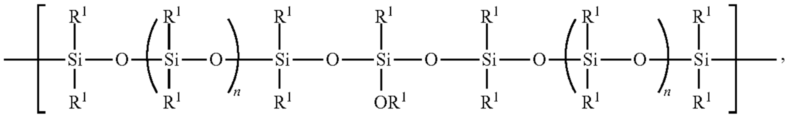

, which means that there is at least one internal group selected from:

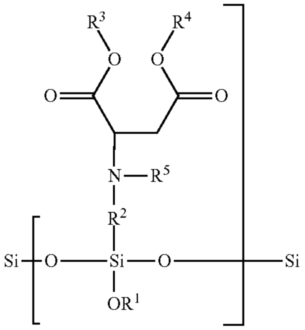

and at least one group of the formula

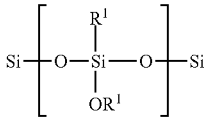

wherein the bonds of the terminal silicon atoms are not shown, and wherein $R^1$, $R^2$, $R^3$, $R^4$, $R^5$ and n are each as defined above. Preferably in such embodiment $R^5$ is hydrogen.

In a preferred embodiment the polyorganosiloxane (1) according to invention, comprises at least one group selected from the formula:

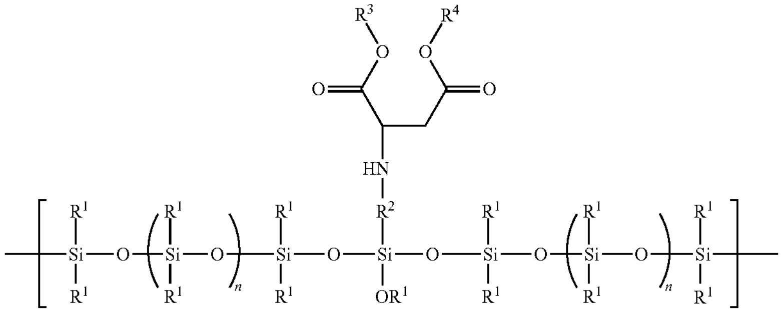

and at least one group selected from the formula:

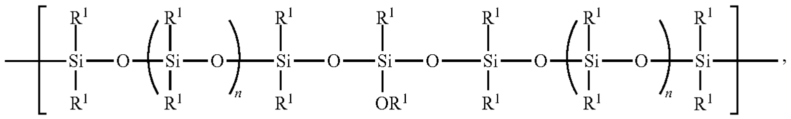

which means that there is at least one internal group selected from:

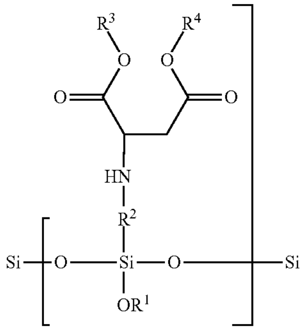

and at least one internal group of the formula

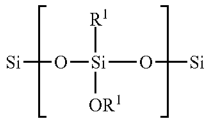

wherein the bonds of the terminal silicon atoms are not shown, and wherein $R^1$, $R^2$, $R^3$, $R^4$ and n are each as defined above. According to the invention it turned out that in particular the simultaneous presence of the internal aspartic acid groups ($T_{aspartic}$)

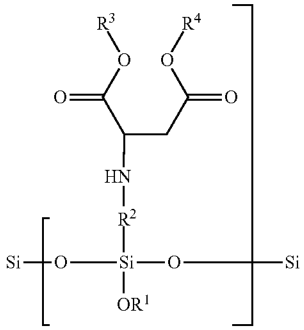

and the internal siloxyalkoxy group ($T_{alkoxy}$)

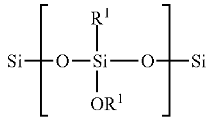

is particularly beneficial and provide for a unique performance property set (i.e. branching or crosslinking during application) while linear silicone structures with only terminal aspartic acid ester groups may have worse performance.

In a preferred embodiment the polyorganosiloxane (1) according to invention comprises at least one group selected from the formula:

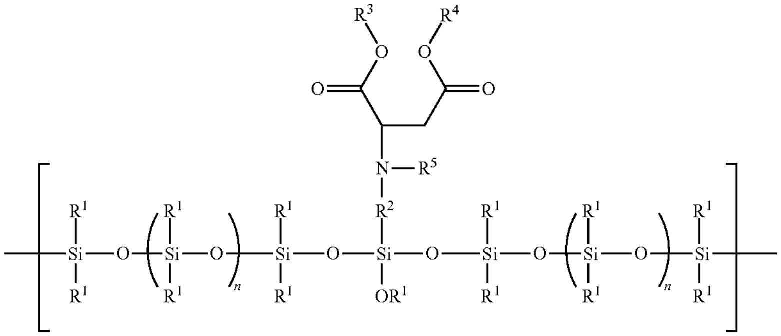

and

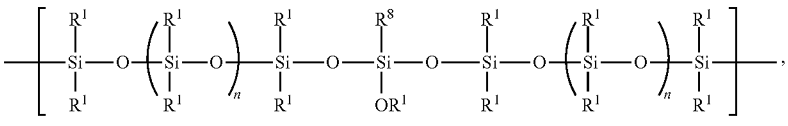

, which means that there is at least one internal group selected from:

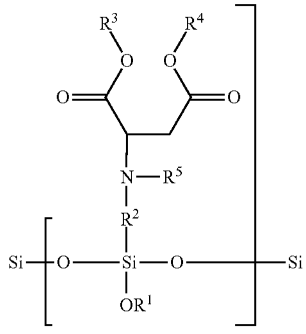

and at least one group of the formula

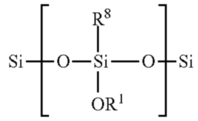

wherein the bonds of the terminal silicon atoms are not shown, and wherein $R^1$, $R^2$, $R^3$, $R^4$, $R^5$, $R^8$ and n are each as defined above. In such embodiment $R^5$ is preferably hydrogen.

The polyorganosiloxanes (I) of the invention are essentially linear, as no branching was observed in their preparation.

In a further preferred embodiment in the polyorganosiloxane (I) according to the invention, the units (A), (B), (E) and (G) are randomly distributed.

In a further preferred embodiment in the polyorganosiloxane (II) according to the invention, wherein the total average number of the units (A) and (B) or (A) and (E) or (A) and (G) in the polyorganosiloxane (I) is from 1 to 10, preferably from 2 to 5. In a preferred embodiment there is on average about one unit (A) and about one unit (B), or one unit (A) and about one unit (E), or one unit (A) and about one unit (G).

In a further preferred embodiment in the polyorganosiloxane (1) according to the invention the molar ratio of the units (A) and (B) or (A) and (E) or (A) and (G) in the polyorganosiloxane (1) is from about 1:20 to about 20:1, preferably from about 1:10 to about 10:1, preferably about 1:5 to about 5:1, more preferably about 1:2 to about 2:1, most preferably about 1:1.

In a further preferred embodiment in the polyorganosiloxane (1) according to the invention the average number of units (A) is from about 0 to about 10, preferably from about 0 to about 5 and the average number of the units (B) or (E) or (G) is from about 0 to about 10, preferably from about 0 to about 5, preferably the average number of units (A) is from about 1 to 2 and the average number of the units (B) or (E) or (G) is from about 1 to about 2.

In a further preferred embodiment in the polyorganosiloxane (1) according to the invention the polyorganosiloxane (1) according to the invention, comprises a mixture of more than one polyorganosiloxane (1) selected from the following combination of terminal groups:

(C) (C), (C) (D) (=(D) (C)), and (D) (D)), or (C) (C), (C) (F) (=(F) (C)), and (F) (F), or (C) (C), (C) (H) (=(H) (C)), and (H) (H), where the groups (C) and (D) are as defined above.

In a particular preferred embodiment, the molar percentages of the units (A) to (H) or (A) to (D) in the polyorganosiloxane (1) according to the invention are:

About 25 to about 45% (A):

(A)

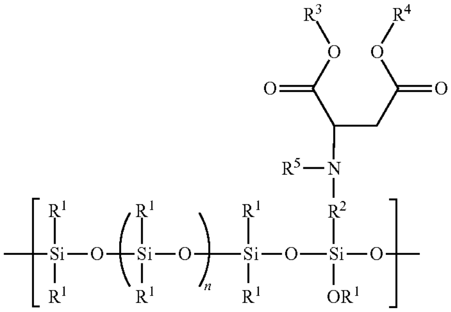

Preferably

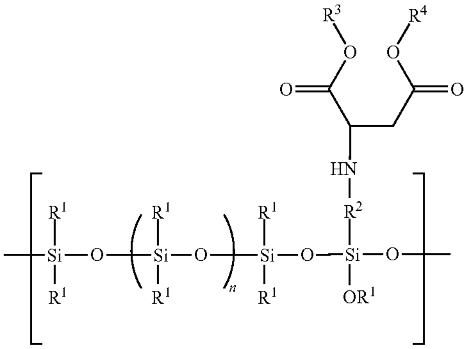

about 8 to about 28% (B):

(B)

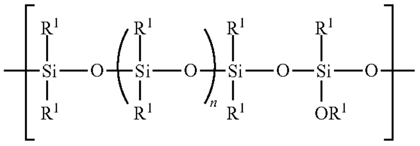

or about 8 to about 28% (E):

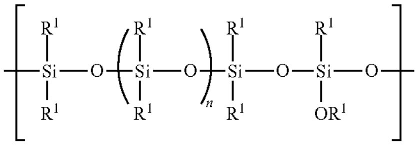
, or about 8 to about 28% (G):

(G)

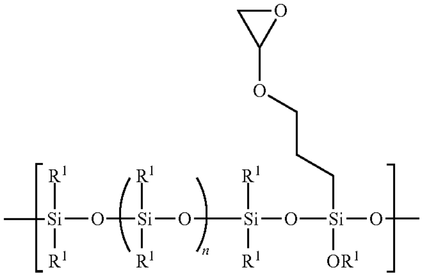

about 3 to 23% (C):

(C)

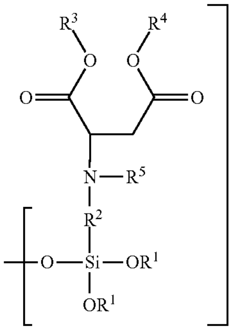

preferably

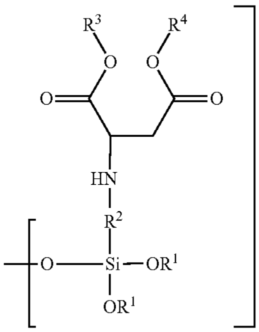

and about 20 to 45% (D):

(D)

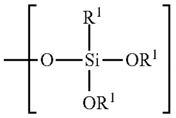
, or (F)

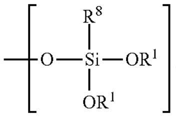
, or (H)

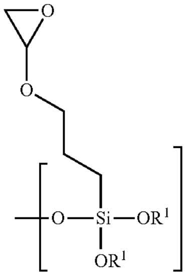

wherein $R^1$, $R^2$, $R^3$, $R^4$, $R^5$, $R^6$, $R^7$, $R^8$, x and n are each as defined above, based on 100 mol-% of the sum of the molar percentages for (A) to (H), or (A) to (D). These percentages can be determined by NMR spectroscopy, including $^1H$—, $^{13}C$— and $^{29}Si$ NMR spectroscopy.

In a preferred embodiment of the invention $R^1$ is selected from alkyl and aryl groups, preferably from alkyl groups, more preferably from $C_1$ to $C_6$ alkyl groups, more preferably from methyl and ethyl groups, most preferably $R^1$ is methyl.

In a preferred embodiment of the invention the polyorganosiloxane (I) has the average formula
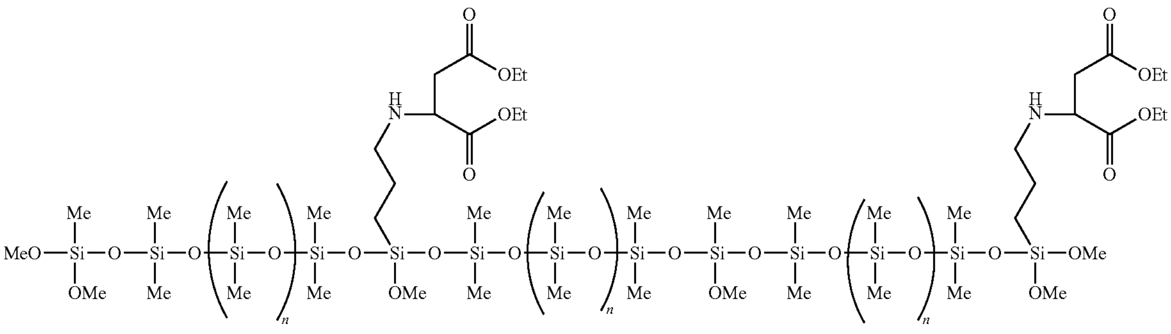
wherein n is as defined above, preferably n is about 4 to about 8.
The polyorganosiloxane (I) according to the invention, may comprise a mixture of two or more of the compounds selected from the following average formulas:
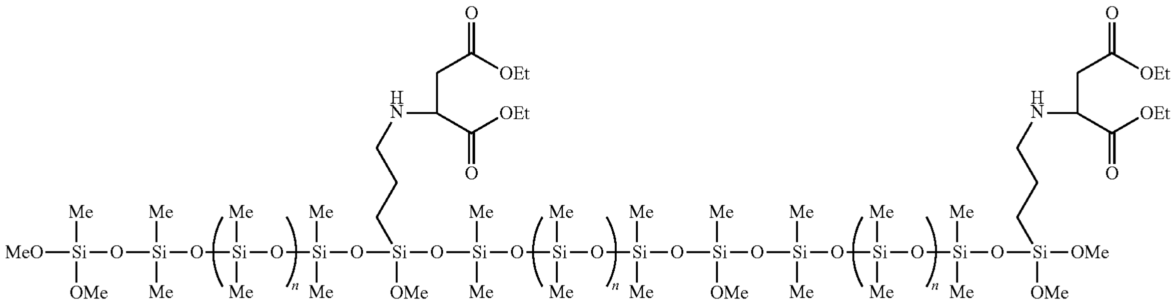
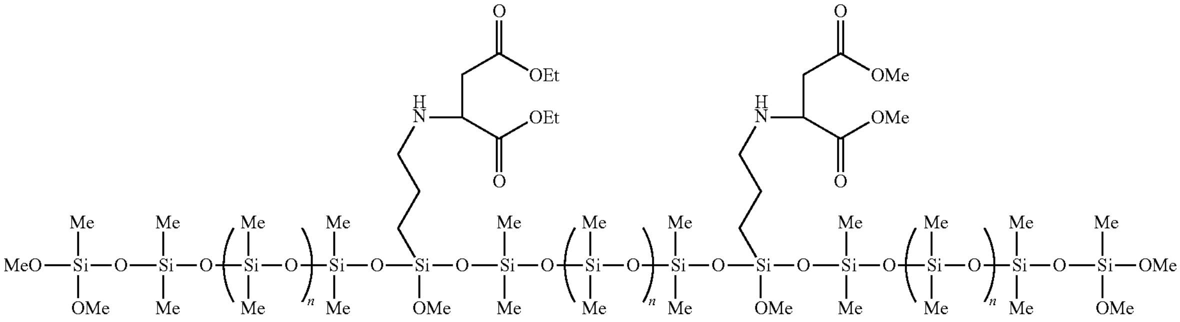
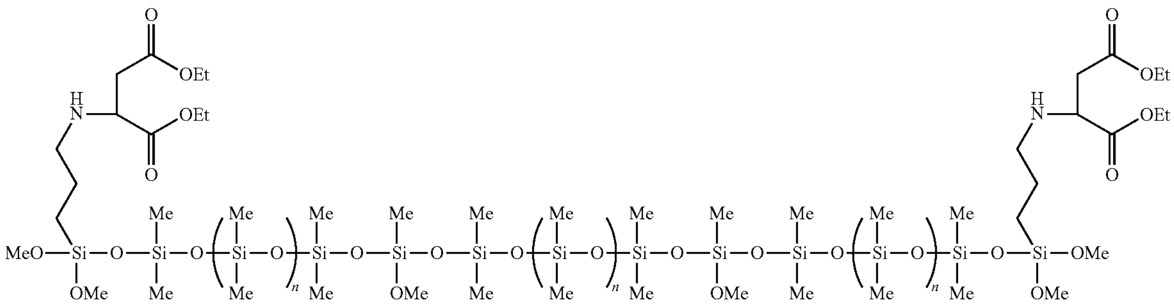

-continued

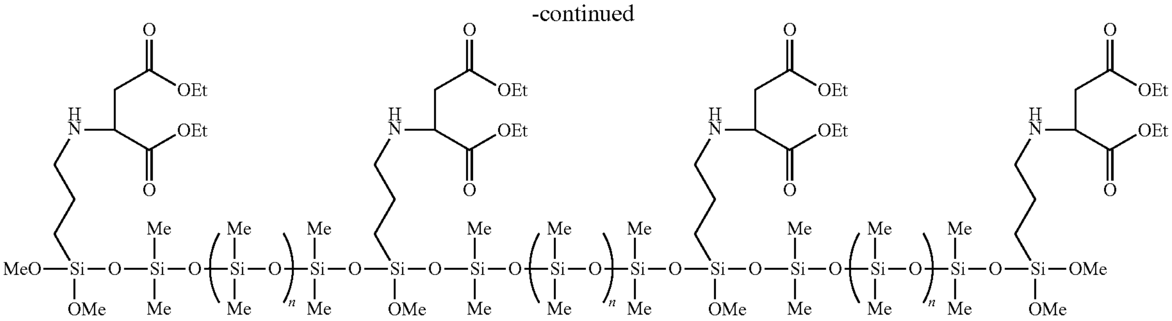

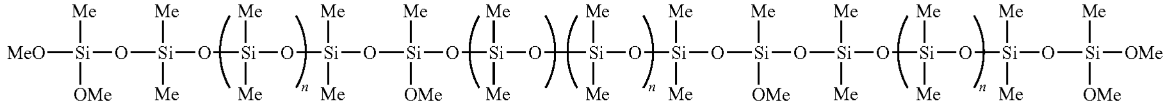

wherein n is as defined above. In such mixture the compound of the average formula

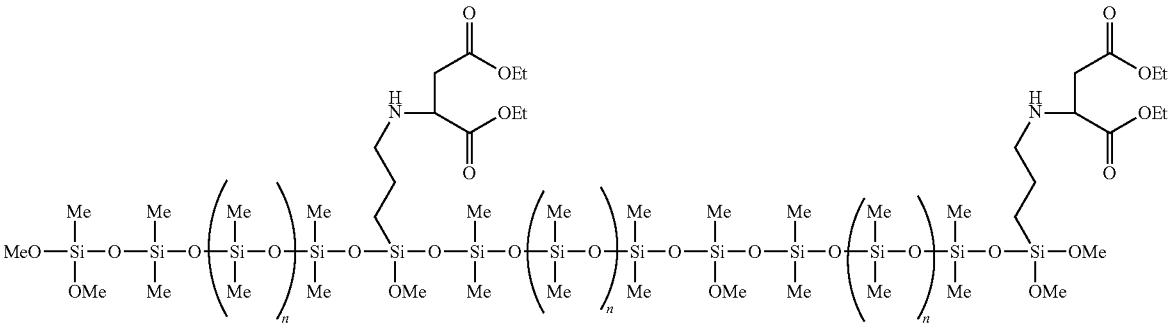

is generally present and even forms the major component (that is at least 50%, more preferably at least 60% by mol) of such a mixture.

The invention further relates to a process for the manufacture of the polyorganosiloxane (I), which comprises the steps of (i) reacting a silane of formula (a)

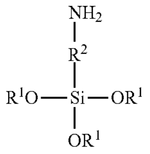

and a silane of the formula (b)

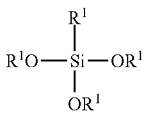

with a silanol of the formula (c):

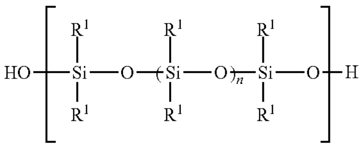

to form a polyorganosiloxane (II) comprising at least one unit of the formula ($A^1$):

($A^1$)

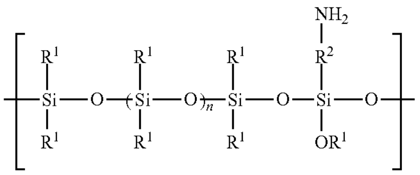

and at least one unit of the formula (B):

(B)

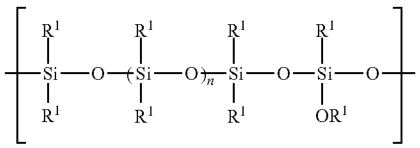

and wherein the terminal units of said polyorganosiloxane (II) are selected of the formulas ($C^1$) and (D):

($C^1$)

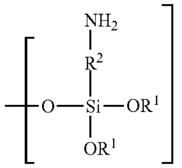

and (D)

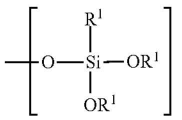

wherein $R^1$, $R^2$ and n are each as defined above, these units (A) to (D) being connected to each other in such a way that Si—O—Si bonds are formed between them, (ii) reacting the polyorganosiloxane (II) obtained in step (i) with a compound (maleic acid ester) of the formula

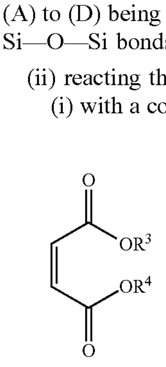

wherein $R^3$ and $R^4$ are each as defined above, to obtain a polyorganosiloxane (1) as defined above.

Likewise, it is also possible to react the aspartic ester-functional trialkoxy silanes

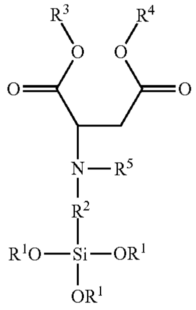

wherein the substituents are each as as defined above and $R^5$ is preferably hydrogen, the epoxy-functional trialkoxy silanes

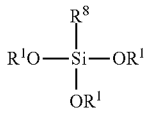

wherein the substituents are each as as defined above, and optionally a non-functional silane of the formula (b):

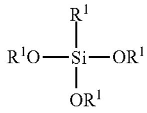

wherein the substituents $R^1$ are each as as defined above such as a alkyltrialkoxy silane, or a mixture thereof, with a silanol of the formula (c):

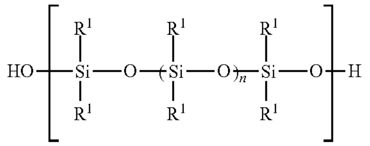

Optionally the process according to the invention further comprises the step of the reaction with an isocyanate-functional alkoxy silane, preferably of the formula OCN—$R^9$—$Si(OR^1)_x(R)_{3-x}{}^1$ wherein x and $R^1$ are as defined above and $R^9$ represents an alkylene group preferably having 1 to 3 carbon atoms, and most preferably $R^9$ represents a —$CH_2$—$CH_2$—$CH_2$— group, to introduce a group $R^5$ different from hydrogen.

Step (i) of the process is usually prepared in the presence of a conventional condensation catalyst such as amines, preferably in the presence of DBU (1,8-Diazabicyclo[5.4.0]undec-7-ene. The reaction is carried out under stirring, heating to around 90° C. to start the reaction as evidenced by foaming or refluxing. After steady refluxing the alcohol, in particular methanol, is collected in a receiver. When reasonable amount of alcohol (such as methanol) was collected and no more alcohol (such as methanol) is coming out, vacuum is applied to remove volatiles.

In step (ii) of the process, the polyorganosiloxane (II) obtained in step (i) is reacted with the maleic acid ester (containing $R^3$ and $R^4$ as seen above). Usually the polyorganosiloxane (II) is charged into a flask equipped with a heating mantle, J-KEM, mechanical stir, dropping funnel and cold-water condenser. Then under stirring at room temperature (RT), the maleic acid ester, such as for example diethyl maleate from the dropping funnel is drop-added. After the addition, the reaction flask is heated to at least 50° C., such as 80° C. and let the reaction continue for at least 1 preferably at least 2 hours to 5 hours, such as 3 hours.

In a further preferred embodiment an oil-in-water emulsion is provided comprising at least one the polyorganosiloxane (I) according to the invention as the oily component. Preferably such oil-in-water emulsion comprises at least one surfactant. In a particular process one or more surfactants are added into a flask equipped with a mechanical stirrer and heating water bath, to dissolve the surfactants. After the surfactants are melted, the polyorganosiloxane (I) is added and mixed. The mixture is cooled to below 30° C., under stirring, and water is added to the mixture. After stirring the mixture is given into an APV homogenizer, and after one or more passes e.g. at 60/600 bar pressure setting stable oil-in-water emulsions of the polyorganosiloxane (I) according to the invention (e.g. with 10 to 50, such as 35 wt-% active) ca be obtained.

In a preferred embodiment the oil-in-water emulsion comprises 0.01 to 30 wt-%, more preferably 0.01 to 20 wt-% of the surfactant and 10 to 80 wt %, preferably 10 to 50 wt % of the polyorganosiloxane (I) according to the invention, the remainder being water, optionally with an organic solvent.

The surfactant may include a cationic surfactants, anionic surfactants or non-ionic surfactants. Cationic surfactant may be selected from primary, secondary, or tertiary amine compounds having up to 50 carbon atoms and salts thereof, amido amine compounds having up to 50 carbon atoms and salts thereof, such as behenamidopropyl dimethylamine and quaternary ammonium compounds, having up to 50 carbon atoms, and preferably with up to 20 carbon atoms in the alkyl groups thereof, such as tetraalkyl ammonium compounds, e.g. hexadecyl-trimethylammonium salts, dimethyldioctadecylammonium salts, distearyldimethylammonium salts, cetrimonium salts, cetylpyridinium salts, alkylbenzyldimethylammonium salts such as benzalkonium salts, benzethonium salts, ester quats having at least one quaternary ammonium group and at least one ester group.

Preferred examples for cationic emulsifiers are quaternary ammonium compounds or amino compounds containing linear or branched C8 to C50, preferred C8 to 40, more preferred C8 to C30 organic groups which optionally have further functional groups, such as alkyl, fatty alcohol and fatty acid based emulsifiers, e.g. fatty acid based ester quats containing one or two fatty acid moieties, fatty amines and ethoxylated/propoxylated fatty amines, such as fatty alcohol polyoxyethylene ether ammonium sulfates.

Preferably, the cationic surfactant is a mono-long alkyl-tri short alkyl quaternized ammonium salt or di-long alkyl-di short alkyl quaternized ammonium salt wherein one or two alkyl substituents are independently selected from an optionally substituted alkyl group of from 9 to 30 carbon atoms and the other short alkyl groups are independently selected from an optionally substituted alkyl group of from about 1 to about 8 carbon atoms. In these cationic surfactants the long alkyl groups may be also replaced by an aromatic group, alkoxy group, polyoxyalkylene group, alkylamido group, hydroxyalkyl group, or alkylaryl group having up 9 to about 30 carbon atoms or the short alkyl groups are replaced by an aromatic group, alkoxy group, polyoxyalkylene group, alkylamido group, hydroxyalkyl group, alkylaryl group having up to about 8 carbon atoms.

Counter ions of the ammonium compounds (which may be quaternized ammonium compounds or protonated amino compounds) include salt-forming anions such as those selected from halogen, (e.g., chloride, bromide), acetate, citrate, lactate, glycolate, phosphate, nitrate, sulfonate, sulfate, alkylsulfate, glutamate, and alkyl sulfonate radicals.

The aliphatic groups in the cationic emulsifiers can contain, in addition to carbon and hydrogen atoms, ether linkages, and other groups such as amino groups. The longer chain aliphatic groups, e.g., those of about 9 carbons, or higher, can be saturated or unsaturated.

Preferably, one alkyl group is selected from an alkyl group of from about 9 to about 30 carbon atoms, more preferably from about 14 to about 26 carbon atoms, still more preferably from about 14 to 22 carbon atoms; the other alkyl groups are independently selected from the group consisting of $—CH_3$, $—C_2H_5$, $—C_2H_4OH$, $—CH_2C_6H_5$, and mixtures thereof; and the counter ion is selected from the group consisting of $CL^-$, $Br^-$, $CH_3OSO_3^-$, and mixtures thereof.

Nonlimiting examples of such mono-long alkyl quaternized ammonium salt cationic surfactants include: behenyl trimethyl ammonium chloride available, for example, with tradename Genamine KDMP from Clariant, with tradename INCROQUAT TMC-80 from Croda and ECONOL TM22 from Sanyo Kasei; stearyl trimethyl ammonium chloride available, for example, with tradename CA-2450 from Nikko Chemicals; cetyl trimethyl ammonium chloride available, for example, with tradename CA-2350 from Nikko Chemicals; behenyltrimethylammonium methyl sulfate, available from FeiXiang; hydrogenated tallow alkyl trimethyl ammonium chloride; stearyl dimethyl benzyl ammonium chloride; and stearoyl amidopropyl dimethyl benzyl ammonium chloride. Cationic surfactants can amido amine surfactants such as stearamidopropyl dimethylamine, behenamidopropyl dimethylamine. Other preferred cationic surfactants are esterquat, for example dipalmitoylethyl hydroxyethylmonium methosulfate (for example tradename stepanquat GA90) or methyl bis [ethyltallowate]-2-hydroxyethyl ammonium methyl sulfate.

Preferred cationic surfactants are for example saturated or unsaturated fatty acid based mono-ester and di-ester quats having 10 to 18 carbon atoms in the alkyl chain. Commercially available examples are Arquad PC SV-60 PG and Armocare VGH70 (Akzo Nobel). Other examples of esterquat, are dipalmitoylethyl hydroxyethylmonium methosulfate (for example tradename Stepanquat® GA90) or methyl bis [ethyltallowate]-2-hydroxyethyl ammonium methyl sulfate.

Most preferred cationic surfactants are mono-long alkyl quaternized ammonium salts having the formula:

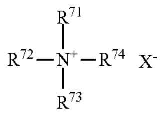

wherein one of $R^{71}$, $R^{72}$, $R^{73}$, and $R^{74}$ is selected from an aliphatic group of from about 16 to about 30 carbon atoms or an aromatic, alkoxy, polyoxyalkylene, alkylamido, hydroxyalkyl, aryl or alkylaryl group having up to about 30 carbon atoms; the remainder of $R^{71}$, $R^{72}$, $R^{73}$, and $R^{74}$ are independently selected from an aliphatic group of from about 1 to about 8 carbon atoms or an aromatic, alkoxy, polyoxyalkylene, alkylamido, hydroxyalkyl, aryl or alkylaryl group having up to about 8 carbon atoms; and X is a salt-forming anion such as those selected from halogen, (e.g., chloride, bromide), acetate, citrate, lactate, glycolate, phosphate, nitrate, sulfonate, sulfate, alkylsulfate, glutamate, and alkyl sulfonate radicals, and wherein the aliphatic groups can contain, in addition to carbon and hydrogen atoms, ether linkages, and other groups such as amino groups. The longer chain aliphatic groups, e.g., those of about 16 carbons, or higher, can be saturated or unsaturated. Preferably, one of $R^{71}$, $R^{72}$, $R^{73}$, and $R^{74}$ is selected from an alkyl group of from about 16 to about 30 carbon atoms, more preferably from about 18 to about 26 carbon atoms, still more preferably from about 22 carbon atoms; the remainder of $R^{71}$, $R^{72}$, $R^{73}$, and $R^{74}$ are independently selected from the group consisting of $—CH_3$, $—C_2H_5$, $—C_2H_4OH$, $—CH_2C_6H_5$, and mixtures thereof; and ($X^-$) is selected from the group consisting of $Cl^-$, $Br^-$, $CH_3OSO_3$ and mixtures thereof. Most preferred are trimethyl(C12 to C24)alkyl ammonium salts, such as cetrimonium chloride, cetrimonium bromide, behentrimonium chloride.

More applicable specific cationic surfactants are disclosed e.g. in WO2009035970 (in particular at page 7, line 8 to page 17, last line) the entire disclosure of which is incorporated by reference and also in US2013/259820 (in particular paragraphs [0074] to [0078] the entire disclosure of which is incorporated by reference).

The anionic surfactant is preferably selected from the group consisting of organic sulfates, organic sulfonates, organic phosphates, organic phosphonates, and organic carboxylates, such as alkyl sulfates including ammonium lauryl sulfate, sodium lauryl sulfate, alkyl-ether sulfates, including sodium laureth sulfate, and sodium myreth sulfate.

Preferred examples for anionic surfactants are organic carboxylates, organic sulfates, organic sulfonates, organic phosphates and organic phosphonates preferably containing linear or branched organic groups having C8 to C50 carbon atoms, preferred C8 to 40 carbon atoms, more preferred C8 to C24 carbon atoms, such as alkyl, fatty alcohol and fatty acid based surfactants, i.e. C8 to C24 fatty acid carboxylates, C8 to C24 fatty acid polyether carboxylates, C8 to C24 fatty acid polyether sulfates, C8 to C24 maleic acid addition products, C8 to C24 fatty alcohol sulfates, C8 to C24 sulfonates, C8 to C40 phosphates containing one or two fatty acid moieties.

Preferably, anionic surfactants suitable for use in the compositions are the alkyl and alkyl ether sulfates. Other suitable anionic surfactants are the water-soluble salts of organic sulfuric acid reaction products. Still other suitable anionic surfactants are the reaction products of fatty acids esterified with isethionic acid and neutralized with sodium hydroxide. Exemplary anionic surfactants for use in the coating include ammonium lauryl sulfate, ammonium laureth sulfate, triethylamine lauryl sulfate, triethylamine laureth sulfate, triethanolamine lauryl sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium lauryl sulfate, potassium laureth sulfate, sodium lauryl sarcosinate, sodium lauroyl sarcosinate, lauryl sarcosine, cocoyl sarcosine, ammonium cocoyl sulfate, ammonium lauroyl sulfate, sodium cocoyl sulfate, sodium lauroyl sulfate, potassium cocoyl sulfate, potassium lauryl sulfate, triethanolamine lauryl sulfate, triethanolamine lauryl sulfate, monoethanolamine cocoyl sulfate, monoethanolamine lauryl sulfate, sodium tridecyl benzene sulfonate, sodium dodecyl benzene sulfonate, sodium cocoyl isethionate and combinations thereof. In a further embodiment of the present invention, the anionic surfactant is sodium lauryl sulfate or sodium laureth sulfate. Preferred anionic surfactants are saturated or unsaturated fatty alcohol based polyether sulfates having 10 to 18 carbon atoms in the alkyl chain and 2 to 30 ethylene oxide (EO) units. Commercially available examples are the Emulsogen EPM types (Clariant).

Further preferred anionic surfactants are saturated or unsaturated fatty alcohol based polyether carboxylates having 10 to 18 carbon atoms in the alkyl chain and 2 to 30 EO units. Commercially available examples are the Empicol types (Huntsman).

Details on anionic surfactants are disclosed in US2015/011449 (WO2015002812A1—page 10) the entire content of which is incorporated by reference herewith, Preferred examples for non-ionic surfactants are ethylene oxide (EO), propylene oxide (PO) and butylene oxide (BO) containing linear or branched C8 to C50, preferred C8 to 40, more preferred C8 to C24 fatty alcohol and fatty acid based emulsifiers as well as saccharide based emulsifiers, i.e. alkyl glycosides, alkoxylated fatty acid sorbitan esters and fatty acid glucamides. Another variety of preferred non-ionic surfactants are the semi-polar amine oxides, phosphine oxides, and sulfoxides.

Preferred non-ionic surfactants are saturated or unsaturated natural alcohol based ethoxylates having 10 to 18 carbon atoms in the alkyl chain and 5 to 80 EO units. Commercially available examples are the Genapol C, LA, V, O and T types (Clariant). Other commercially available examples at Aldrich are Brij C2, a non-ionic ethoxylated alcohol based on cetyl alcohol and Brij S100 a polyoxyethylen(100)stearylether.

Preferred non-ionic surfactants are linear or branched oxo alcohol based ethoxylates having 11 to 17 carbon atoms in the alkyl chain and 5 to 100 EO units. Commercially available examples are the Genapol UD, OA, OX, X, LCN types (Clariant).

Preferred non-ionic surfactants are saturated or unsaturated alcohol based block ethoxylates-propoxylates having 10 to 18 carbon atoms in the alkyl chain and 2 to 20 EO units. Commercially available examples are the Genapol EP types (Clariant).

Preferred non-ionic surfactants are ethoxylate-propoxylate block copolymers containing 5 to 70 wt % EO units. Commercially available examples are the Genapol PF and PH types (Clariant).

Preferred non-ionic surfactants are saturated or unsaturated fatty acid based ethoxylates having 10 to 18 carbon atoms in the alkyl chain and 5 to 100 EO units. Commercially available examples are the Genagen O and S types (Clariant).

Preferred non-ionic surfactants are saturated or unsaturated fatty acid based castor oil ethoxylates having 10 to 18 carbon atoms in the alkyl chains and 5 to 80 EO units. Commercially available examples are the Emulsogen HCO and EL types (Clariant).

Preferred non-ionic surfactants are saturated or unsaturated fatty acid derivatized oligoglycerines. Preferred examples are fatty acid derivatized di-, tri, or tetraglycerines, i.e. mono- or diesters of diglycerine having having 10 to 18 carbon atoms in the alkyl chain and optionally 5 to 100 EO units. Commercially available examples are the Hostacerine types (Clariant).

Preferred non-ionic surfactants are saturated or unsaturated fatty acid sorbitan ester based ethoxylates having 10 to 18 carbon atoms in the alkyl chain and 5 to 50 EO units attached to the sorbitan ring. A commercially available example is Emulsogen 4156 (Clariant).

Preferred non-ionic surfactants are saturated or unsaturated alcohol based glycosides having 8 to 18 carbon atoms in the alkyl chain and 1 to 10 glycosyl units. Commercially available examples are Plantacare 818 up and 1200 up (BASF).

Preferred non-ionic surfactants are saturated or unsaturated fatty acid based glucamides, preferred fatty acid N-methylglucamides, having 8 to 18 carbon atoms in the alkyl chain. A commercially available example is the MEGA-10 type (Avanti).

Preferred non-ionic surfactants are saturated or unsaturated fatty acid based alkanolamides, fatty acid based ethanolamides, having 8 to 18 carbon atoms in the alkyl chain. Commercially available examples are the Aminon C types (Kao).

Preferred non-ionic surfactants are the fatty amine or fatty acid amide based amine oxides having 8 to 30 carbon atoms in the alkyl chain. Commercially available examples are the Tomamine AO types (Air products) and the Genamineox types (Clariant).

Preferably, suitable betaine surfactants include those surfactants broadly described as derivatives of aliphatic secondary and tertiary amines in which the aliphatic radical can be straight or branched chain and wherein one of the aliphatic substituents contains from about 8 to about 30 carbon atoms and one contains an anionic group such as carboxy, sulfonate, sulfate, phosphate, or phosphonate. Exemplary amphoteric surfactants for use in the formulations of the present invention include cocoamphoacetate, cocoamphodiacetate, lauroamphoacetate, lauroamphodiacetate, and mixtures thereof.

They also include those surfactants broadly described as derivatives of aliphatic quaternary ammonium, phosphonium, and sulfonium compounds, in which the aliphatic radicals can be straight or branched chain, and wherein one of the aliphatic substituents contains from about 8 to about 30 carbon atoms and one contains an anionic group such as carboxy, sulfonate, sulfate, phosphate or phosphonate.

Preferred carbobetaine surfactants are saturated or unsaturated fatty acid based sarcosides having 10 to 18 carbon atoms in the alkyl chain. A commercially available example is Medialan LD (Clariant).

Preferred carbobetaine surfactants are saturated or unsaturated fatty acid based amido propyl betaines having 10 to 18 carbon atoms in the alkyl chain. A commercially available example is Genagen CAB (Clariant).

Preferred sulfobetaine surfactants are saturated or unsaturated fatty acid based taurides having 10 to 18 carbon atoms in the alkyl chain. A commercially available example is Hostapon CT (Clariant).

Details on betaine surfactants are disclosed in US2015/011449, the entire content of which is incorporated by reference herewith.

Preferred examples for cationic silicone based emulsifiers are quaternary ammonium groups or amino groups containing emulsifiers of the ABA type with EO/PO moieties attached to the terminal quat or amino ends of a silicone chain (WO2009/042083 the entire content of which is incorporated by reference herewith) or quat/amino emulsifiers having polyether moieties attached to the silicone chain in a comb like arrangement (US2008/213208 the entire content of which is incorporated by reference herewith).

In another preferred embodiment of the invention hydrophilic polyhydroxy moieties as well as oleophilic fatty alkyl or fatty alkyl ester moieties are attached to the silicone chain (US2012/289649 the entire content of which is incorporated by reference herewith). A commercially available example for this type of W/O emulsifier is Silform EOF (Momentive Performance Materials).

It is within the scope of the invention to use more than one surfactant in order to optimize the formulation stability.

The polyorganosiloxanes (I) or their oil-in-water emulsions according to the invention can be used for example in the manufacture of paints, coatings, adhesives, foams, encapsulants, including polyurethane vacuum casting resins, polyurethane quick cast resins, elastomer curing PU cast resins, electrical potting compounds, edge casting compounds; polyurethane articles including mattresses, shoe soles, gaskets, hoses, floors, insulating materials, sealants, skis, car seats, running tracks in stadiums, dashboards, casting compounds, latex-free condoms and cast floors.

The polyorganosiloxanes (I) or their oil-in-water emulsions according to the invention further can be used for example as additive or co-resin in industrial/architectural/construction coatings, adhesives and sealants (waterborne and solventborne acrylic, epoxy, urethane, silicone, melamine, polyester, powder coating, etc.).

Particularly preferred is the use of the polyorganosiloxane (I) according to the invention or its oil-in-water emulsion as an additive for coating compositions, preferably easy-to-clean coating compositions and as a release agent and antigraffiti additive for coating compositions.

Particularly preferred is further the use of the polyorganosiloxane (I) according to the invention or its oil-in-water emulsion as an additive for polyurethane resin or acrylic resin based coating compositions, preferably for solvent- or water-based antigraffiti 2K-polyurethane topcoats.

Particularly preferred is further the use of the polyorganosiloxane (I) according to the invention or its oil-in-water emulsion as an additive for curable compositions, preferably comprising polyisocyanates.

Polyisocyanates include various polyisocyanates, including in particular aliphatic, aromatic or cycloaliphatic polyisocyanates with an NCO functionality of greater than or equal to 2 and are known to one of ordinary skill in the art.

Representative and non-limiting examples of such suitable polyisocyanates include 1,4-butylene diisocyanate, 1,6-hexamethylene diisocyanate (HDI), isophorone diisocyanate (IPDI), 2,2,4-trimethylhexamethylene diisocyanate, 2,4,4-trimethylhexamethylene diisocyanate, bis(4,4'-isocyanatocyclohexyl)methane, isomeric mixture containing bis(4,4'-isocyanatocyclohexyl)methane of any desired isomer content, 1,4-cyclohexylene diisocyanate, 4-isocyanatomethyl-1,8-octane diisocyanate, 1,4-phenylene diisocyanate, 2,4-tolylene diisocyanate, 2,6-tolylene diisocyanate, 1,5-naphthylene diisocyanate, 2,2'-diphenylmethane diisocyanate, 2,4'-diphenylmethane diisocyanate, 4,4'-diphenylmethane diisocyanate, 1,3-bis(2-isocyanatoprop-2-yl)benzene, 1,4-bis(2-isocyanatoprop-2-yl)benzene, 1,3-bis(isocyanatomethyl)benzene, alkyl 2,6-diisocyanatohexanoates (lysine diisocyanates) with $C_1$-$C_8$-alkyl groups and mixtures thereof.

The polyisocyanates also include higher molecular oligomeric polyisocyanates which are prepared therefrom by using suitable modification reactions, such as e.g. trimerization or biuretizing. Hexamethylenediisocyanate and isophorone diisocyanate can be used as starting diisocyanates for preparing the corresponding polyisocyanates. Such oligomeric polyisocyanates are preferred in the present invention. They include polyisocyanates in which at least two generally equal diisocyanate units are bond to each other by reacting a part of the isocyanate groups, optionally by adding for example monohydric or polyhydric alcohols.

Particularly preferred oligomeric polyisocyanates are dimers, trimers or mixtures of dimers and trimers of a diisocyanate. Those oligomeric polyisocyanates have a higher molecular weight than the corresponding diisocyanates. An oligomeric polyisocyanate based on hexamethylene diisocyanate preferably has a molecular weight higher than 168.20 grams/mole calculated on the basis structure of the molecules (=number-average). An oligomeric polyisocyanate based on isophorone diisocyanate preferably has a molecular weight higher than 222.29 grams/mole calculated on the basis structure of the molecules. In the sense of the present invention it is particularly preferred that the oligomeric polyisocyanates are obtained by reacting only one type of diisocyanate, as for example only hexamethylene diisocyanate or only isophorone diisocyanate as the diisocyanate unit. Preferably, the oligomeric polyisocyanates have a molecular weight less than 1500 grams/mole calculated on the basis structure of the molecules. Depending on the reaction conditions, different reactions of the diisocyanate units can occur to form the polyisocyanates.

Furthermore, the polyisocyanates also include the reaction products of diisocyanates with preferably low molecular weight polyols to form polyurethanes. Such polyols preferably have a molecular weight range of 62 to 400 grams/mole calculated on the basis structure of the molecules.

The reactions of the diisocyanate can form different functional groups, such as, for example, uretdione, isocyanurate, iminooxadiazindione, urethane, allophanate, biuret and/or oxadiazintrione groups. Oligomeric polyisocyanates, which have at least one of these functional groups, can be referred to as "derivatives" of the corresponding diisocyanates. In general, the synthesis the oligomeric polyisocyanates do not occur in the form of defined compounds but are mixtures of different oligomers, which have a molecular weight distribution. The oligomeric polyisocyanates can preferably include the following types of structures having the formulae (IX)-(XV), as disclosed in Nachrichten aus der Chemie (News from Chemistry), 55, 380-384 (2007):

urethane (IX)

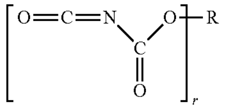

allophanate (X)

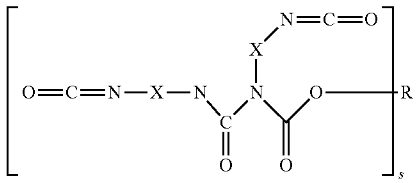

-continued biuret (XI)

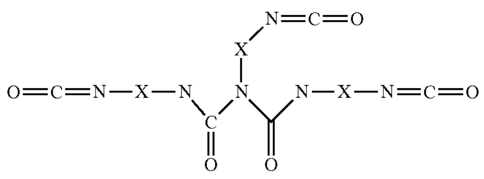

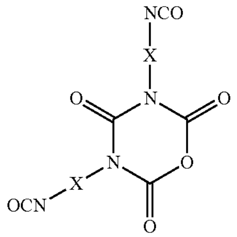

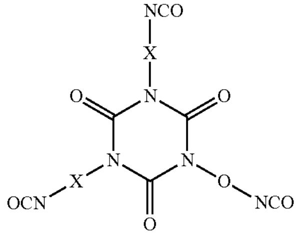

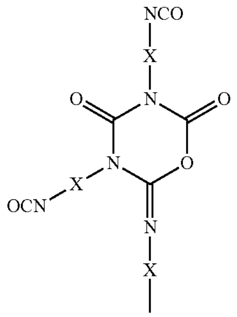

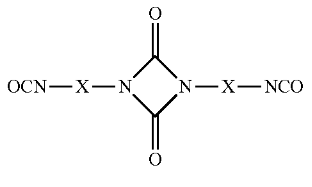

oxadiazintrione (XII) isocyanurate (XIII) iminooxadiazindione (XIV) uretdione (XV) wherein X is an aliphatic residue, R is an organic group, n is an integer ranging from 1 to 10, preferably 2 or 3, and m is an integer ranging from 2 to 10, preferably 2 or 3. The oligomeric polyisocyanates can contain at least one of these functional groups and may contain two or more of these different functional groups. Particularly preferred structures for X are $—CH_2CH_2CH_2CH_2CH_2CH_2—$, when it is an oligomeric polyisocyanate based on hexamethylene diisocyanate, or

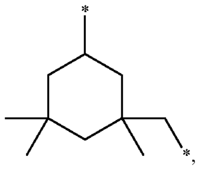

when it is an oligomeric polyisocyanate based on isophorone diisocyanate.

Preferred are thus oligomeric polyisocyanates, which have a functionality of ≥2, and are selected from uretdione, isocyanurate, urethane, allophanate, biuret, iminooxadiazinedione or oxadiazinetrione compounds of formulae (IX)-(XV), and also mixtures of these compounds, in particular containing trivalent or higher valent aliphatic groups on the polyisocyanates, such as biuret, allophanate, urethane and isocyanurates, and higher oligomers of diisocyanates, in particular, oligomers of hexamethylene diisocyanate, 1-isocyanato-3,3,5-trimethyl-5-isocyanatomethyl-cyclohexane and/or bis(isocyanatocyclohexyl)-methane. Specific examples of such polyisocyanates include, for example, the biuret of hexamethylene diisocyanate having the structure:

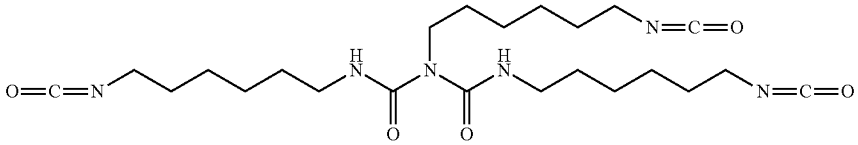 [SMILES: O=C=NCCCCCCNC(=O)N(CCCCCCN=C=O)C(=O)NCCCCCCN=C=O]

and oligomers thereof, which is commercially available from Covestro under the trade designation Desmodur© 100, the isocyanurate trimer of hexamethylene diisocyanate having the structure:

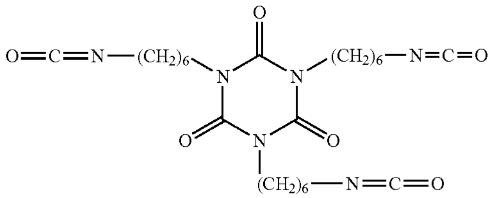

and commercially available from Covestro under the trade designation, Desmodur© N3300, N,N',N"-tris-[(4-isocyanato-1,3,3-trimethylcyclohexyl)methyl]isocyanurate, commercially available from Covestro under the trade designation, Desmodur© Z4470 or from Vencorex under the trade designation, Tolonate IDT 70B, higher oligomers thereof such as pentamers having the structure:

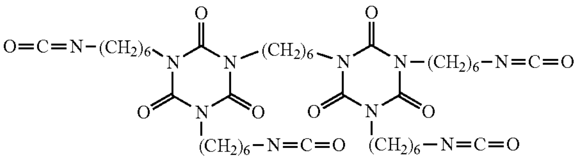

which is based on hexamethylene diisocyanate and the analogous pentamer based upon 4,4'-methylenebis(cyclohexyl isocyanate) or asymmetric trimers such as:

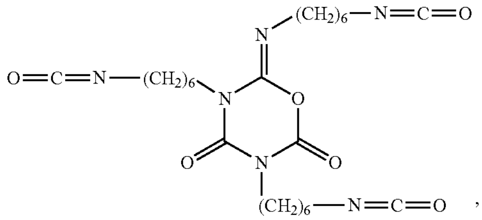

which is based on hexamethylene diisocyanate and the analogous asymmetric trimer based upon 4,4'-methylenebis (cyclohexyl isocyanate).

Particularly suitable polyisocyanates include isocyanates, or mixtures thereof, having an average NCO functionality of preferably 2.0 to 5.5, preferably 2.8 to 5.0 and more preferably of 3.0 to 4.5. The NCO content, based on the solids content of polyisocyanate, is preferably about 2 to about 50 weight percent, preferably about 10 to about 30 weight percent, and more preferably about 11 to about 25 weight percent. The content of monomeric diisocyanate in the polyisocyanate is preferably less than about 10 weight percent, more preferably less than about 2 weight percent and most preferably less than about 0.5 weight percent.

Particularly suitable polyisocyanates include polyisocyanate adducts containing biuret, isocyanurate, iminooxadiazine dione, uretdione, allophanate and/or urethane groups. The urethane groups are based on the reaction products of monomeric isocyanates with molecular weight polyfunctional alcohols such as trimethylol propane, 1,6-hexanediol, 1,5-pentanediol, diethylene glycol, triethylene glycol, 2,2,4-trimethyl-1,3-propanediol, neopentyl glycol and mixtures thereof. These polyisocyanate adducts are described, for example, in J. Prakt. Chem., 336, 185-200 (1994) and "Lackharze, Chemie, Eigenschaften und Anwendungen", publ. D. Stoye, W. Freitag, Hanser Verlag, Munich, Vienna 1996.

The polyisocyanate adducts may be prepared by the oligomerization of monomeric diisocyanates, as described for example in J. Prakt. Chem., 336, 185-200 (1994). Examples of suitable monomeric diisocyanates include 1,4-butane diisocyanate, 1,6-hexane diisocyanate, 3-isocyanatomethyl-3,3,5-trimethylcyclohexylisocyante (isophorone diisocyanate), 2-methyl-1,5-pentane diisocyanate, 2,2,4-trimethyl-hexamethylene diisocyanate, 1,12-dodecane diisocyanate, bis(isocyanatomethyl)norbornane and 4,4'-diisocyanato-cyclohexyl methane.

Particularly preferred are polyisocyanates containing isocyanurate groups (trimers) which have an NCO functionality of 3.0 to 4.5 and a monomer content of less than 2 weight percent. They may be prepared by the trimerization process described in EP 330,996. Furthermore, exemplary polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("H. sub. 12MDI"), p-phenylene diisocyanate ("PPDI"), m-phenylene diisocyanate ("MPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"), xylene diisocyanate ("XDI"), p-tetramethylxylene diisocyanate ("p-TMXDI"), m-tetramethylxylene diisocyanate ("m-TMXDI"), ethylene diisocyanate, propylene-1,2-diisocyanate, tetramethylene-1,4-diisocyanate, cyclohexyl diisocyanate, 1,6-hexamethylene-diisocyanate ("HDI"), dodecane-1,1 2-diisocyanate, cyclobutane-1,3-diisocyanate, cyclohexane-1,3-diisocyanate, cyclohexane-1,4-diisocyanate, 1-isocyanato-3,3,5-trimethyl-5-isocyanatomethylcyclohexane, methyl cyclohexylene diisocyanate, isocyanurate of HDI, triisocyanate of 2,4,4-trimethyl-1,6-hexane diisocyanate ("TMDI"), tetracene diisocyanate, naphthalene diisocyanate, anthracene diisocyanate, tris(4-isocyanatophenyl)methane (available from Covestro under the trade designation Desmodur R), 1,3,5-tris(3-isocyanato-4-methylphenyl)-2,4,6-trioxohexahydro-1,3,5-triazine (available from Covestro under the trade designation Desmodur IL), N-isocyanatohexyl-aminocarbonyl N,N'-bis(isocyanatohexyl)urea (available from Covestro under the trade designation, Desmodur N), 2,4,6-trioxo-1,3,5-tris(6-isocyanatohexyl)hexa-hydro-1,3,5-triazine (available from Covestro under the trade designation, Desmodur N3390), 2,4,6-tirioxo-1,3,5-tris(5-isocyanato-1,3,3-trimethylcyclohexylmethyl)hexahydro-1,3,5-triazine (available from Covestro under the trade designation, Desmodur N4370), 4,4'-dimethyldiphenymethane-2,2',5,5-tetraisocyanate, 4-methyldiphenylmethane-3,5,2',4',6'-pentaisocyanate, and the like.

For better handling, the polyisocyanate (mixtures) can be diluted with up to about 50 weight percent of conventional solvents. Suitable solvents are those that are not reactive towards NCO groups, such as butyl acetate, ethyl acetate, 1-methoxy-2-propyl acetate, toluene, 2-butanone, xylene, 1,4-dioxane, N-methylpyrrolidone, dimethyl acetamide, dimethyl formamide and dimethyl sulphoxide.

In a further preferred embodiment, the invention relates to a curable coating composition comprising at least one of the polyorganosiloxane (I) according to the invention.

Preferably the curable coating compositions of the invention, comprise:

A) at least polyorganosiloxane (I) according to the invention as defined above;

B) at least one polyisocyanate; and

C) and one or more isocyanate-reactive compounds (different from A)).

The isocyanate-reactive compounds are not particularly limited, but preferably includes a compound having within the molecule thereof two or more active hydrogen atoms having reactivity with the isocyanate group. Representative and non-limiting examples of the compound having within the molecule thereof two or more active hydrogen atoms include polyols, polyamines and polythiols. Among these, polyols and polyamines are preferable. Polyamines are particularly preferred. Specific non-limiting examples of the polyol include polyester polyol, polyether polyol, acrylic polyol, polyolefin polyol and fluorine-containing polyol, preferably acrylic polyol and/or polyester polyol. These compounds, which have within the molecule thereof two or more active hydrogen atoms, may be used each alone or in combinations of two or more thereof. Preferably are polyols, in particular hydroxyfunctional acrylic resins.

The curable composition using the compound of the invention can be a solvent based or water-based compositions. When a solvent based or water based curable composition is prepared, additives such as another isocyanate-reactive compound, a catalyst, a pigment, a leveling agent, an antioxidant, an ultraviolet absorber, a light stabilizer, a plasticizer, a surfactant and other ingredients typically used in coatings may be added. The organic solvent or water is may be added, if necessary, to regulate the viscosity of the mixture. The isocyanate-reactive compound can be also added as a water dispersion or a water-solved form.

The polyester polyols can be obtained for example by the condensation reaction between, without being limited to the following, a single acid or an acid mixture of dibasic acids such as carboxylic acids such as succinic acid, adipic acid, dimer acid, maleic anhydride, phthalic anhydride, isophthalic acid, terephthalic acid, and 1,4-cyclohexanedicarboxylic acid, and a single polyhydric alcohol or a mixture of polyhydric alcohols of ethylene glycol, propylene glycol, diethylene glycol, 1,4-butanediol, neopentyl glycol, 1,6-hexanediol, trimethylpentanediol, cyclohexanediol, trimethylolpropane, glycerin, pentaerythritol, 2-methylolpropanediol, and ethoxized trimethylolpropane. Moreover, for example, polycaprolactones obtained by ring-opening polymerization, using a polyhydric alcohol, of lactones such as E-caprolactone can also be used as polyester polyols.

Representative and non-limiting examples of the polyether polyols include for example polyether polyols obtained by random or block addition, to polyhydric hydroxy compounds, of a single alkylene oxide or a mixture of alkylene oxides, such as ethylene oxide, propylene oxide, butylene oxide, cyclohexene oxide and styrene oxide, by using a hydroxide, such as lithium, sodium, or potassium hydroxide, a strongly basic catalyst, such as an alcoholate, or an alkylamine, and composite metal cyan compound complex, such as metal porphyrin, or zinc hexacyanocobaltate complex; polyether polyols obtained by reaction of an alkylene oxide with a polyamine compound, such as ethylenediamine; and so-called polymer polyols obtained by polymerizing acrylamide or the like by using these polyether polyols as media.

Representative and non-limiting examples of the polyhydric hydroxy compound include for example polyols such as diglycerin, ditrimethylolpropane, pentaerythritol and dipentaerythritol; sugar alcohol compounds such as erythritol, D-threitol, L-arabinitol, ribitol, xylitol, sorbitol, mannitol, galactitol and rhamnitol and saccharides, such as oligosaccharides.

The acrylic polyols can be obtained for example, by copolymerizing a polymerizable monomer having one or more active hydrogen atoms in one molecule thereof and another monomer copolymerizable with the aforementioned polymerizable monomer. Examples of active hydrogen-containing acrylic acid esters are 2-hydroxyethyl acrylate, 2-hydroxypropyl acrylate and 2-hydroxybutyl acrylate, or methacrylic acid esters, such as 2-hydroxyethyl methacrylate, 2-hydroxypropyl methacrylate, 2-hydroxybutyl methacrylate, 3-hydroxypropyl methacrylate and 4-hydroxybutyl methacrylate; polyhydric active hydrogen-containing (meth) acrylic acid esters, such as (meth)acrylic acid monoesters of triols such as glycerin and trimethylolpropane. Copolymerizable monomers include (meth)acrylic acid esters, such as methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, isobutyl methacrylate, n-hexyl methacrylate, cyclohexyl methacrylate, lauryl methacrylate and glycidyl methacrylate, unsaturated carboxylic, acids such as acrylic acid, methacrylic acid, maleic acid and itaconic acid, unsaturated amides, such as acrylamide, N-methylolacrylamide and diacetone acrylamide, or hydrolyzable silyl group-containing vinyl monomers, such as vinyltrimethoxysilane, vinylmethyldimethoxysilane and γ-(meth)acryloxypropyltrimethoxysilane, and other polymerizable monomers, such as styrene, vinyltoluene, vinyl acetate, acrylonitrile and dibutyl fumarate.

Representative and non-limiting examples of the polyolefin polyol include polybutadienes having two or more hydroxyl groups, hydrogenated polybutadienes having two or more hydroxyl groups, polyisoprene having two or more hydroxyl groups and hydrogenated polyisoprene having two or more hydroxyl groups.

In a preferred embodiment the curable composition comprises at least one aliphatic polyamine. As used herein, "polyamine" refers to compounds having at least two amino groups, each containing at least one active hydrogen (N—H group) selected from primary amino and secondary amino groups. Exemplary aliphatic polyamines include aliphatic primary polyamines, aliphatic secondary polyamines, and combinations thereof. Exemplary non-limiting aliphatic primary polyamines include poly(oxypropylene)diamines, such as JEFFAMINE D-230 and JEFFAMINE D-400 from Huntsman, poly(oxypropylene)triamines, preferably with a molecular weight in the range of 400-5000 grams/mole, 1,4-diaminobutane, 1,2-ethylenediamine, 1,2-diaminopropane and 1,3-diaminopropane. Exemplary non-limiting secondary amines include cyclic aliphatic secondary diamines, non-cyclic aliphatic secondary diamines. Additional exemplary and non-limiting secondary amines include aspartic acid ester polyamines. Useful cyclic aliphatic secondary diamines comprise two, optionally substituted, hexyl groups bonded by a bridging group, wherein each of the hexyl rings comprises a secondary amine substituent as described for example in WO 2013/188176. Commercially available aliphatic cyclic secondary diamines having this structure include those available as CLEARLINK 1000 and CLEARLINK 3000 from Dorf Ketal Chemicals LLC. In another embodiment, useful aliphatic cyclic secondary diamines comprise a single hexyl ring. Commercially available cycloaliphatic secondary diamine having this structure are available for example as JEFFLINK 754 from Huntsman.

Useful aliphatic cyclic secondary diamines can be prepared by reaction of isophorone diamine and a compound having a Michael acceptor group that reduces the nucleophilicity of the resulting secondary amine groups. Representative Michael acceptors include acrylonitrile and α,β- unsaturated carbonyl compounds, with acrylonitrile typically preferred. In some embodiments, the alkylene group between the terminal —CN group and the amine group has at least two carbon atoms. Commercially available aliphatic cyclic secondary diamines having this structure include for example HXA CE 425 from Hanson Group LLC., and BAXXODUR PC-136 from BASF.

Exemplary non-cyclic aliphatic secondary diamines include N,N'-bis(3',3'-dimethylbutan-2-yl)-1,6-diaminohexane, available from Albemarle Corporation under the trade designation ETHACURE 90.

Particularly preferred polyamines are aspartic acid ester polyamines. These aspartic acid ester polyamines are polyamines with secondary amino groups that can be produced, for example, by addition of primary aliphatic diamines to maleic or fumaric acid dialkyl esters, or by addition of primary aliphatic amines to unsaturated oligoesters or polyesters. Useful aspartic acid ester polyamines include, for example, aspartic acid ester polyamines have the general formula:

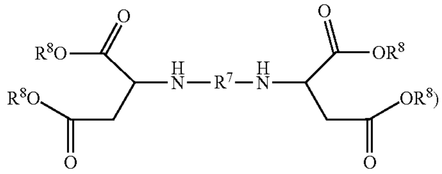

wherein $R^7$ is a divalent organic group having up to 40 carbon atoms, and each $R^8$ independently represents a lower alkyl group having 1 to 4 carbon atoms. For example, $R^8$ may be methyl, ethyl, propyl, or butyl. Preferably, $R^7$ represents a divalent aliphatic group, preferably having 1 to 20 carbon atoms, which can be, for example, branched, unbranched, or cyclic. More preferably, $R^7$ is selected from divalent hydrocarbon groups butylene, hexylene, 2,2,4-trimethylhexylene, or obtained by the removal of the amino groups from 1-amino-3,3,5-trimethyl-5-aminomethylcyclohexane, 4,4'-diamino-dicyclohexylmethane or 3,3-dimethyl-4,4'-diamino-dicyclohexylmethane. In some embodiments, $R^7$ is a branched C4 to C12 alkylene group.

Suitable aspartic acid ester amine resins are commercially available from Covestro under the trade designations DESMOPHEN NH 1420, DESMOPHEN NH 1520, and DESMOPHEN NH 1220. DESMOPHEN NH 1420 resin is substantially composed of the following compound:

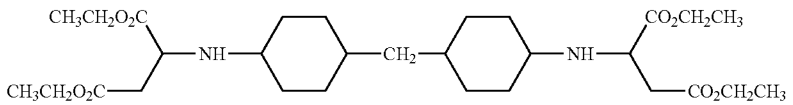

DESMOPHEN NH1520 resin is substantially composed of the following compound:

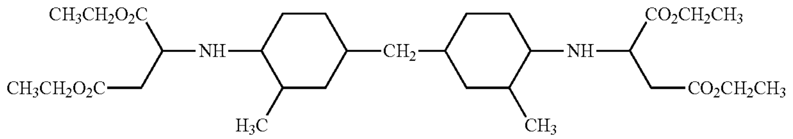

DESMOPHEN NH 1220 is substantially composed of the following compound:

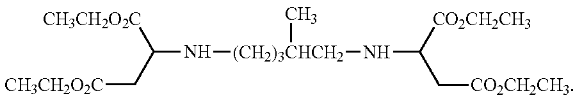

The aliphatic polyamine(s) may be combined with one or more aromatic polyamines. Suitable solid aromatic polyamines include alkyl anilines such as 4,4'-methylenebis (2-isopropyl-6-methylaniline) commercially available from Lonza under the trade designation LONZACURE M-MIP A, 4,4'-methylenebis(2,6-diisopropylaniline) commercially available from Lonza under the trade designation LONZA-CURE M-DIPA, 4,4'methylenebis(2-ethyl-6-methylaniline) and 4,4'-methylenebis(3-chloro-2, 6-diethylaniline) commercially available from Lonza under the trade designation LONZACURE MCDEA.

The one or more isocyanate-reactive compounds, the polyisocyanates composition can be used as such or mixed with organic solvents. The organic solvent is not particularly limited, but the organic solvent preferably has no functional group to react with a hydroxyl group and an isocyanate group and is preferably sufficiently compatible with the polyisocyanate composition. Examples of such an organic solvent include, without being limited to, the following compounds generally used as coating material solvents such as ester compounds, ether compounds, ketone compounds, aromatic compounds, ethylene glycol dialkyl ether-based compounds, polyethylene glycol dicarboxylate-based compounds, hydrocarbon-based solvents and aromatic solvents.

The curable coating composition of the present invention may comprise various conventional additives such as a catalyst, a pigment, a leveling agent, an antioxidant, an ultraviolet absorber, a light stabilizer, a plasticizer and a surfactant.

Representative and non-limiting examples of the curing promoting catalyst include metal salts, such as dibutyltin dilaurate, tin 2-ethylhexanoate, zinc 2-ethylhexanoate and cobalt salts; and tertiary amines such as triethylamine, pyridine, methylpyridine, benzyldimethylamine, N,N-dimethylxcyclohexylamine, N-methylpiperidine, pentamethyldiethylenetriamine, N,N'-endoethylenepiperazine and N,N'-dimethylpiperazine.

The curable coating composition of the present invention can be used as, without being limited to, coating materials, for example, roll coating, curtain flow coating, spray coating, bell coating and electrostatic coating. For example, the curable coating composition of the present embodiment is also useful as the coating material for the primer or the upper and intermediate coating for the materials such as metals, including a steel plate and a surface-treated steel plate, plastic, wood, film, and inorganic materials. The curable coating composition of the present embodiment is also useful as the coating material for imparting, for example, aesthetics, weatherability, acid resistance, rust prevention and chipping resistance to, for example, pre-coat metal including anti-rust steel plates and vehicle coating. Moreover, the curable coating composition of the present embodiment is also useful as a urethane starting material for adhesives, pressure-sensitive adhesives, elastomers, foams and surface-treating agents.

Further the present invention relates to the cured compositions obtained by curing the curable compositions according to the invention.

The curable compositions according to the invention can be used for various application such as the manufacture of paints, coatings, adhesives, foams, encapsulants, such a polyurethane vacuum casting resins, polyurethane quick cast resins, elastomer curing polyurethane cast resins, electrical potting compounds, edge casting compounds; polyurethane articles, such as mattresses, shoe soles, gaskets, hoses, floors, insulating materials, paints, adhesives, sealants, skis, car seats, running tracks in stadiums, dashboards, casting compounds, latex-free condoms and cast floors.

Further, the present invention relates to the articles comprising the cured compositions according to the invention.

Further the present invention relates to a coating obtained by curing the curable compositions according to the present invention and the resulting composite articles, comprising at least one substrate having on at least a part of the surface thereof a cured composition containing at least one polyorganosiloxane (1) according to the invention. Preferred substrates on which the coating composition of the present invention can be applied are for example selected from the group consisting of metal, plastic, concrete and wood. Preferred is in particular metal, which include all kinds of metals including those which are pre-treated for example by galvanization.

While the above description contains many specifics, these specifics should not be construed as limitations on the scope of the invention, but merely as exemplifications of preferred embodiments thereof. Those skilled in the art may envision many other possible variations that are within the scope and spirit of the invention as defined by the claims and preferred embodiments appended hereto.

Embodiments of the invention include in particular:

1. A polyorganosiloxane (1) comprising at least one unit of the formula (A):

(A)

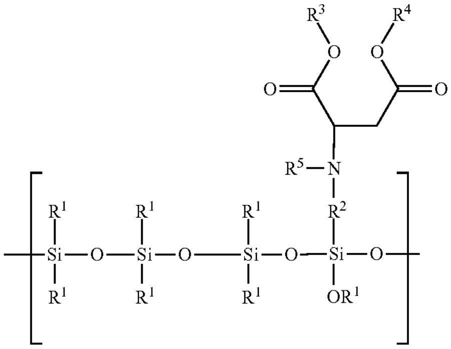

and at least one unit of the formula (B):

(B)

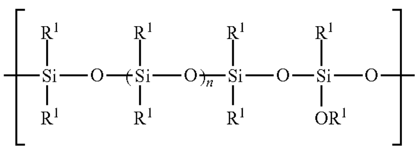

and wherein the terminal units of said polyorganosiloxane are selected of the formulas (C) and (D):

(C)

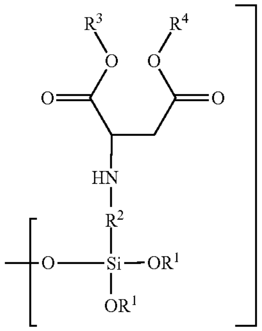

and (D)

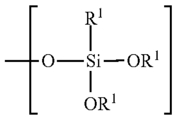

these units (A) to (D) being connected to each other in such a way that Si—O—Si bonds are formed between them, wherein each n is an average number of about 1 to 250, preferably 1 to 100, more preferably 1 to 40, more preferably 1 to 30; more preferably 1 to 20, and most preferably 2 to 10, each $R^1$ is independently selected from organic groups, preferably selected from aliphatic or aromatic groups, more preferably selected from an n-alkyl, iso-alkyl, or tertiary alkyl having up to 30 carbon atoms, an alkoxyalkyl having up to 30 carbon atoms, cycloalkyl having from 5 to 30 carbon atoms, an aryl having from 6 to 30 carbon atoms, an alkylaryl having from 7 to 30 carbon atoms, which groups can contain in addition by one or more oxygen, nitrogen, sulfur and/or fluorine atoms, and $R^1$ optionally have substituent groups such functional groups such as epoxy groups, alkenyl groups such as vinyl groups, acrylate groups, mercapto groups, or poly($C_2$-$C_4$)-alkylene ethers with up to 500 alkylene oxy units, the groups $R^1$ preferably being free of aliphatic unsaturation, and $R^1$ can be a polyorganosiloxanyl residue comprising at least one siloxy unit selected from the group consisting of $R_3SiO_{1/2}$, $R_2SiO_{2/2}$, $RSiO_{3/2}$ and $SiO_{4/2}$, wherein R can be an organic group, preferably R is a methyl or phenyl group, preferably $R^1$ is a monovalent hydrocarbon radical including alkyl radicals, such as $CH_3$—, $CH_3CH_2$—, $CH_3CH_2CH_2$—, $(CH_3)_2CH$—, $C_8H_{17}$— and $C_{10}H_{21}$—, cycloaliphatic radicals including cyclohexylethyl, aryl radicals including phenyl, tolyl, xylyl, aralkyl radicals including benzyl and 2-phenylethyl, monovalent halohydrocarbon radicals have the formula $C_mF_{2m+1}CH_2CH_2$— wherein m has a value of from 1 to 10, including $CF_3CH_2CH_2$—, $C_4F_9CH_2CH_2$—, $CeF_{13}CH_2CH_2$—, or halohydrocarbon radicals substituted with an oxygen including $C_2F_5$—$O(CF_2$—$CF_2$—$O)_{1-10}CF_2$—, $F[CF(CF_3)$—$CF_2$—$O]_{1-5}$—$(CF_2)_{0-2}$—, $C_3F_7$—$OCF(CF_3)$— and $C_3F_7$—$OCF(CF_3)$—$CF_2$—$OCF(CF_3)$—, more preferably $R^1$ is a methyl or phenyl, and most preferably $R^1$ is methyl, each $R^2$ is independently selected from the group consisting of a straight chain alkylene group having from 1 to 10 carbon atoms, branched chain alkylene group having from 3 to 10 carbon atoms, a cycloalkylene group having from 3 to 10 carbon atoms, an arylene group having from 6 to 12 carbon atoms, an aralkylene group having from 7 to 10 carbon atoms and an arenylene group having from 7 to 10 carbon atoms, preferably methylene, propylene, 2-methylbutylene and 2,2-dimethylbutylene and more preferably a branched chain alkylene group having from 3 to 10 carbon atoms, such as 2,2-dimethylbutylene bound in particular to the Si and N atoms as shown schematically below:

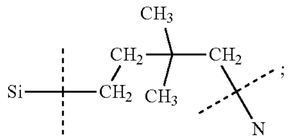

each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms.

2. The polyorganosiloxane (1) according to the previous embodiment 1, comprising at least one group of the formula:

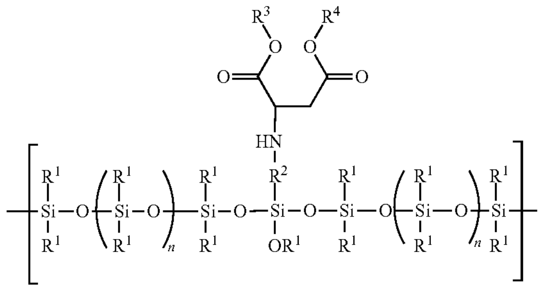

and

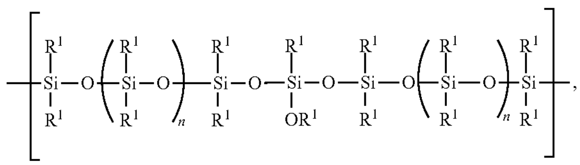

, which means that there is at least one internal group selected from:

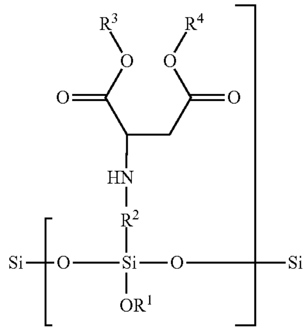

and at least one group of the formula

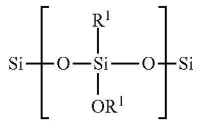

wherein the bonds of the terminal silicon atoms are not shown, and wherein $R^1$, $R^2$, $R^3$, $R^4$ and n are each as defined above.

3. The polyorganosiloxane (1) according to any of the previous embodiments 1 and 2, wherein units (A) and (B) are randomly distributed.

4. The polyorganosiloxane (1) according to any of the previous embodiments 1 to 3, wherein the total average number of the units (A) and (B) in the polyorganosiloxane (1) is from 1 to 10.

5. The polyorganosiloxane (1) according to any of the previous embodiments 1 to 4, wherein the molar ratio of the units (A) and (B) in the polyorganosiloxane (1) is from about 1:20 to about 20:1, preferably from about 1:10 to about 10:1, more preferably about 1:5 to about 5:1, more preferably about 1:2 to about 2:1, most preferably about 1:1.

6. The polyorganosiloxane (1) according to any of the previous embodiments 1 to 5, wherein the average number of units (A) is from about 0 to about 10, preferably from about 0 to about 5 and the average number of the units (B) is from about 0 to about 10, preferably from about 0 to about 5, preferably the average number of units (A) is from about 1 to 2 and the average number of the units (B) is from about 1 to about 2.

7. The polyorganosiloxane (1) according to any of the previous embodiments 1 to 6, comprising a mixture of polyorganosiloxane (1) having the following combination of terminal groups:

(C) (C), (C) (D) (=(D) (C)), and (D) (D).

8. The polyorganosiloxane (1) according to any of the previous embodiments 1 to 7, wherein the molar percentages of the units (A) to (D) in the polyorganosiloxane (1) are: about 25 to about 45% (A):

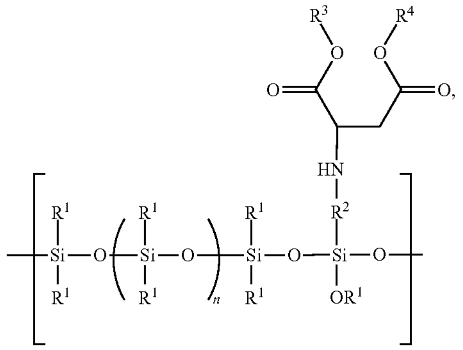

about 8 to about 28% (B):

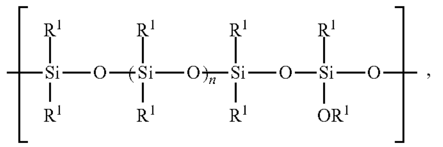

about 3 to 23% (C):

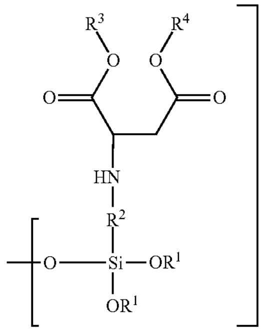

and about 20 to 45% (D):

(D)

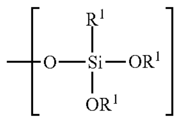

wherein $R^1$, $R^2$, $R^3$, $R^4$ and n are each as defined above, based on 100 mol-% of the sum of the molar percentages for (A) to (D).

9. The polyorganosiloxane (1) according to any of the previous embodiments 1 to 8, wherein $R^1$ is methyl.

10. The polyorganosiloxane (1) according to any of the embodiments 1 to 9, which has the average formula:

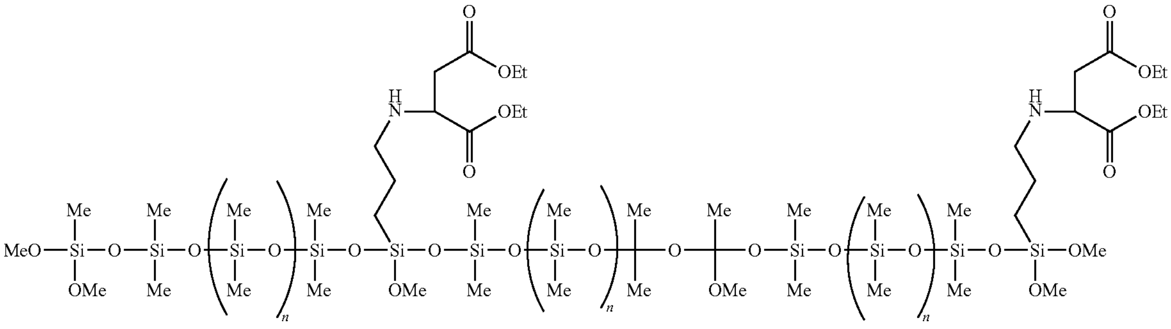
wherein n is as defined above.
11. The polyorganosiloxane (1) according to any of the embodiments 1 to 10, which comprises at least two of the compounds selected from the following average formulas:
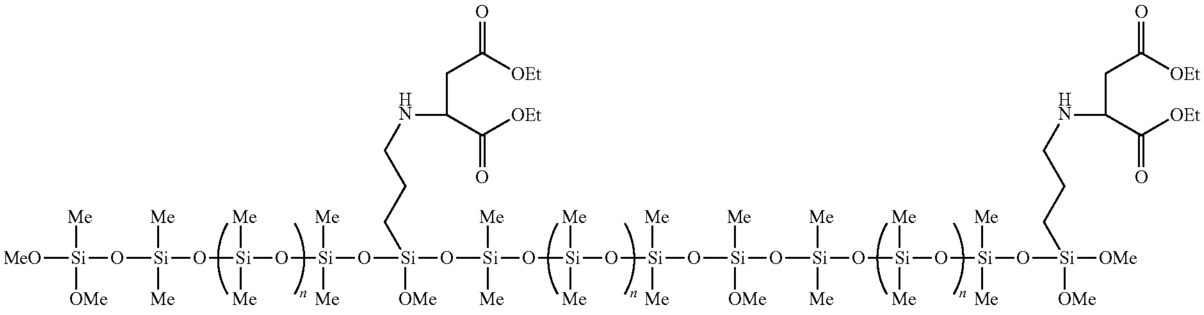
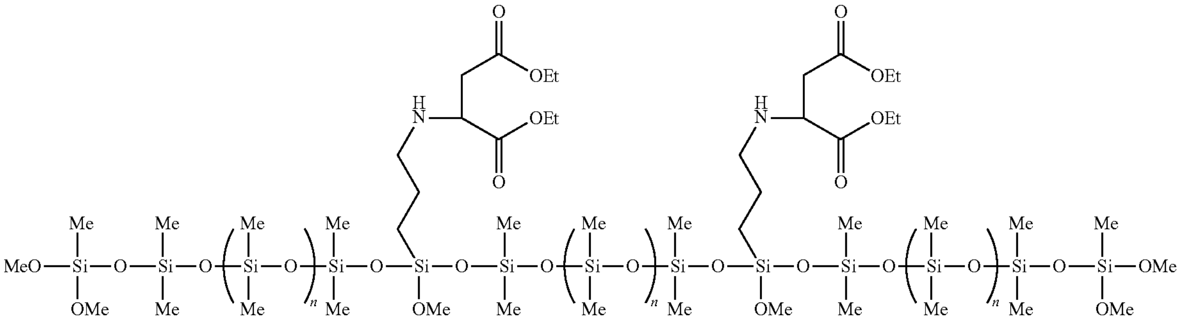
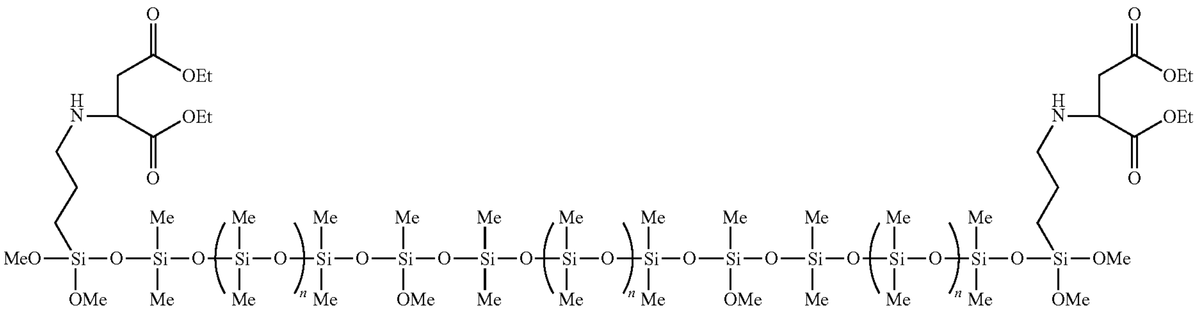

-continued

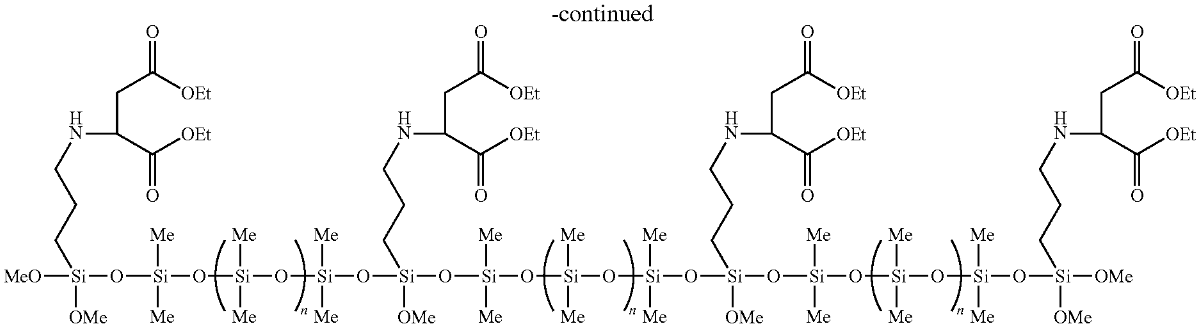

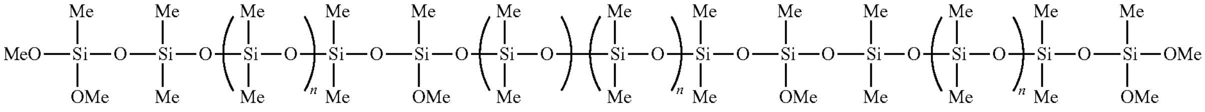

wherein n is as defined above.

12. A process for the manufacture of the polyorganosiloxane (1) according to any of the previous embodiments 1 to 11, which comprises the steps of (i) reacting a silane of formula (a)

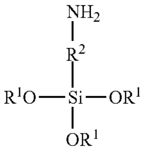

and a silane of the formula (b)

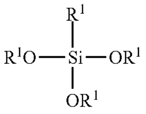

with a silanol of the formula (c):

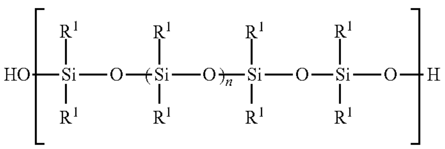

to form a polyorganosiloxane (II) comprising at least one unit of the formula ($A^1$):

($A^1$)

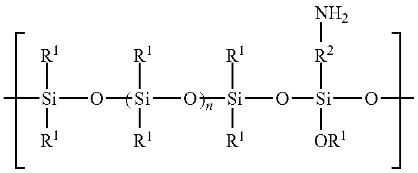

and at least one unit of the formula (B):

(B)

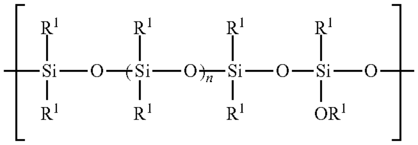

and wherein the terminal units of said polyorganosiloxane (II) are selected of the formulas ($C^1$)

($C^1$)

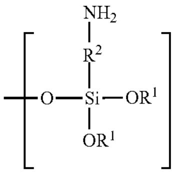

and (D)

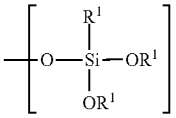

wherein $R^1$, $R^2$ and n are each as defined above, these units (A) to (D) being connected to each other in such a way that Si—O—Si bonds are formed between them, (ii) reacting the polyorganosiloxane (II) obtained in step (i) with a compound of the formula

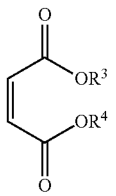

wherein $R^3$ and $R^4$ are each as defined above, to obtain a polyorganosoloxane (I) as defined above.

13. An oil-in-water emulsion comprising at least one the polyorganosiloxane (1) according to any of the previous embodiments 1 to 11 as the oily component.

14. Use of the polyorganosiloxane (1) according to any of the previous embodiments 1 to 11 in the manufacture of paints, coatings, adhesives, foams, encapsulants, including polyurethane vacuum casting resins, polyurethane quick cast resins, elastomer curing PU cast resins, electrical potting compounds, edge casting compounds; polyurethane articles including mattresses, shoe soles, gaskets, hoses, floors, insulating materials, paints, adhesives, sealants, skis, car seats, running tracks in stadiums, dashboards, casting compounds, latex-free condoms and cast floors.

15. Use of the polyorganosiloxane (1) according to any of the previous embodiments 1 to 11 as an additive for coating compositions, preferably easy-to-clean coating compositions and as a release agent and antigraffiti additive for coating compositions.

16. Use of the polyorganosiloxane (1) according to the previous embodiments 1 to 11 as an additive for polyurethane resin or acrylic resin based coating compositions.

17. Use of the polyorganosiloxane (1) according to any of the previous embodiments 1 to 11 as an additive for curable compositions, preferably comprising polyisocyanates.

18. A coating composition comprising at least one of the polyorganosiloxane (1) as defined in any of the previous embodiments 1 to 11.

19. A cured composition obtained by the curing of the curable composition comprising the polysiloxane (1) as defined in any of the previous embodiments 1 to 11.

20. An article comprising the cured composition of embodiment 19 on a substrate.

The present invention will be explained in more detail by the following examples.

EXAMPLES

Example 1: Synthesis of Aspartic Acid Ester-Functional Polysiloxane AEAFP-1 (Example 2 from WO2020079097, Comparative)

3-Aminopropyltriethoxysilane (221 grams, 1 mole, obtained from Momentive under the trade designation Silquest™ A-1100 silane) was charged into a 1000 ml four neck flask, equipped with stirrer, condenser, thermometer and dropping funnel. Over the dropping funnel 260 grams of a hydroxyl terminated polydimethysiloxane with an —OH content of 4.4 mmols/gram or 1.15 mole —OH were added to the aminosilane over 30 minutes, starting at room temperature. During the feeding the temperature increased up to 31° C. After the feeding, the mixture was heated up to 70° C. and held for 2 hours at 70° C. After that, the formed ethanol was stripped out at 150° C., 20 mbar. Yield: 450 grams of a low viscous aminofunctional polysiloxane (AFP-1) with an amine content of 2.5 mmole N/gram, determined by titration with 1 molar hydrochloric acid. On the next step aminofunctional polysiloxane AFP-1 (610 grams, 2 moles of amino groups) was charged in a 2000 ml four neck flask, equipped with stirrer, condenser, thermometer and dropping funnel. Diethyl maleate (340 grams, 2 moles) was added dropwise from the dropping funnel to the aminofunctional polysiloxane AFP-1 during a 4-hour period maintaining a reaction temperature at 20-30° C. Afterwards, the temperature of the flask was increased to 80° C. and the reaction mixture was maintained at this temperature for 4 hours. Finally, the reaction mixture was cooled down and used in further experiments without further purification. The following general structure of the product (AEAFP-1) was confirmed by the $^1H$ and $^{29}Si$ NMR analyses.

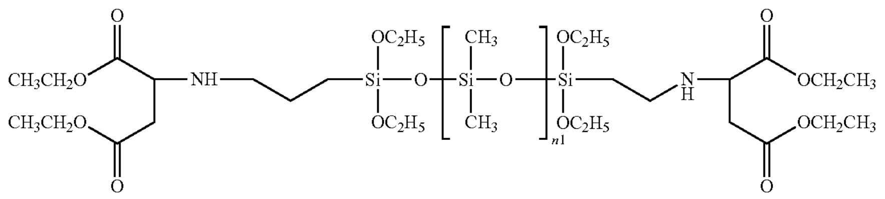

wherein n1 is about 4 to about 8.

Example 2: Synthesis of Aspartic Acid Ester-Functional Polysiloxane AEAFP-2 (Inventive)

Into a 2-liter flask equipped with a J-KEM, stir bar, and cold-finger reflux distillation unit, charged 950 g silanol-terminated polydimethylsiloxane (2.0 mols, from Momentive contains 7.15% —OH group), 163.6 g Methyltrimethoxysilane (1.2 mols, A-1630 from Momentive), 215.2 g gamma-aminopropyltrimethoxysilane (1.2 mols, A-1110 from Momentive) and 0.1 g DBU (1,8-Diazabicyclo[5.4.0] undec-7-ene from Aldrich). Under stirring, the flask was heated to around 90° C. to start the reaction as evidenced by foaming or refluxing. After steady refluxing, start collecting Methanol into the receiver. When reasonable amount of methanol was collected and no more methanol was coming out, vacuum was applied to get more volatiles out in the collector bottle, gradually reaching maximum vacuum until no more volatiles coming out. Collect the product in the reaction flask as AFP-2 intermediate. On the next step 990 g of AFP-2 sample (Amine equivalent weight is 990 gram per mole of $NH_2$ group) was charged into a 2-liter flask equipped with a heating mantle, J-KEM, mechanical stir, dropping funnel and cold-water condenser Then under stirring at RT, 189 g of Diethyl Maleate (97% purity from Aldrich) from the dropping funnel was drop-added to the flask. After the addition, then the reaction flask was heated to 80° C. and the reaction was continued for at least 3 hours. Then the heating was stopped and the flask was let to cool to RT, the reaction product as AEAFP-2 resin was collected and used as it is in the following steps. The following general average structure of the product (AEAFP-2) was confirmed by the $^1H$ and $^{29}Si$ NMR analyses.

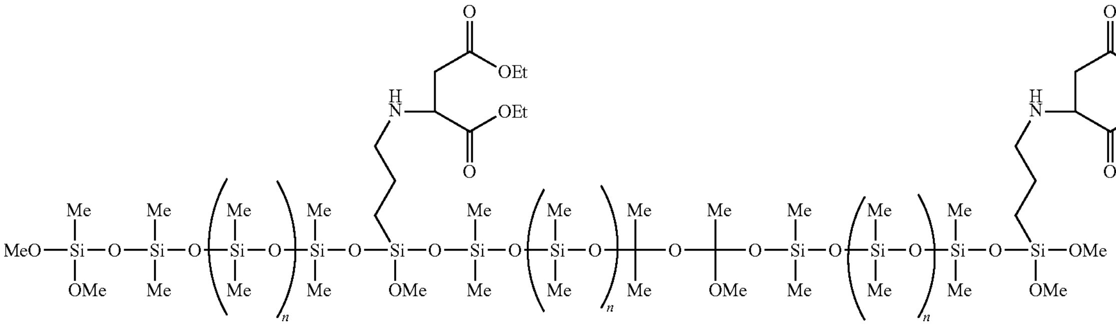

wherein n is an average value of about 4 to about 7.

Example 3: Preparation of Aspartic Acid Ester-Functional Polysiloxane Emulsion Em1-AEAFP-2 (Inventive)

Into a flask equipped with a mechanical stirrer and heating water bath, 40 g of solvent Texanol (from Aldrich), and 8.4 g Brij C2 (from Aldrich) and 5.6 g Brij S100 (from Aldrich), the 2 latter products being non-ionic surfactants, were charged. The water bath was heated to melt or dissolve the two surfactants. After the surfactants totally melted, 140 g AEAFP-2 sample (from Example 2) were mixed in. The mixture was cooled down to below 30° C., under efficient stirring, and 206 g of de-ionized (DI) water were charged in. The mixture was further stirred for 30 minutes. The mixing was stopped and the mixture was poured into an APV homogenizer. After 3 passes at 60/600 bar pressure setting, ~400 g stable emi-AEAFP-2 emulsion (35 wt-% active) was obtained.

Example 4: Preparation of Aspartic Acid Ester-Functional Polysiloxane Emulsion Em2-AEAFP-2 (Inventive)

Into a flask equipped with a mechanical stirrer and heating water bath, 146 g DI water, 20.7 g Stepanol WA-EXTRA (29%, from Stepan company), 23.3 g Stenol CS-230 (26%, from Stepan company) were charged. The mixture was stirred for 10 minutes at 35-40° C., then 200 g AEAFP-2 sample (from Example 2) were mixed in and the mixture was further stirred for 30 minutes. The mixing was stopped and the mixture was poured into an APV homogenizer. After 3 passes at 50/500 bar pressure setting, ~400 g stable em2-AEAFP-2 emulsion (50% active) was obtained.

Example 5: Formulation and Application of Solvent-Based (SB) Antigraffiti 2K-Polyurethane Topcoats 2K solventborne polyurethane antigraffiti coatings were prepared by cold blending of the commercial white topcoat material with various antigraffiti additives listed in the table 1. Antigraffiti additives were used at 5 wt.-% concentration based on total ready-to-use formula (paint with activator). After mixing for 1 h, white topcoats were activated with the commercial aliphatic polyisocyanate crosslinker (at a paint: activator ratio of 2:1). After mixing paint with the activator for 5 minutes at 150-300 rpm, the resulting paint systems were transferred into the pneumatic, conventional, manual, gravity feed spray-gun, equipped with a 1.6 mm spray nozzle. Spray pressure was adjusted to 2.0-2.5 bar. Wet film builds of the coating systems were controlled with the lab wet film gauge. The topcoat systems were sprayed over cold rolled steel substrate panels (Gardobond OC). Before spraying, substrate panels were cleaned with a paper cloth immersed in xylene and then with a paper cloth immersed in isopropyl alcohol. After spraying, liquid coating films were cured for 14 days at room temperature (50% Relative Humidity (RH)). Dry film thickness of the coating systems was set at 80-85 microns.

TABLE 1

2K SB (solvent based) polyurethane antigraffiti coatings

| Antigraffiti additive | Example of solvent-based antigraffiti polyurethane coating |
|---|---|
| no additive | 2K SB PUR 1 |
| CoatOSil 2812 polysiloxane-polyether, block-copolymer | 2K SB PUR 2 |
| AEAFP-1 (comparative) | 2K SB PUR 3 |
| AEAFP-2(inventive) | 2K SB PUR 4 |

Example 6: Formulation and Application of Water-Based (WB) Antigraffiti 2K-Polyurethane Topcoats The formulation of white 2K polyurethane topcoat systems was carried out in accordance with the general recipe summarized in the table 2. For this, positions 1-8 were charged into the double-jacket mixing vessel equipped with cowles blade dispersion mixer under agitation at 300 rpm. After charging the pigment in, the mixture was dispersed at 1000 rpm for 30 minutes. During the mixing and the dispersing process, the mixing vessel was cooled down to 35-55° C. Afterwards the resulting pre-mix was charged with 1 kilogram of Zr-beads (01.2-1.4 mm) and grinded at 1000 rpm. for 45 minutes. During the mixing and the grinding process the mixing vessel was cooled down to 35-55° C. After the process was complete, the liquid phase of the resulting mixture was separated from the Zr-beads and the resulting titanium dioxide dispersion was charged with positions 9-14. After charging, the mixture was stirred at 300-500 rpm for 30 minutes. The resulting white topcoat (Part A) was carefully collected and stored until further use in dry and dark place. Separately from the white topcoat, positions 15-17 were mixed under nitrogen by agitation in the 3-neck glass flask equipped with mechanical stirrer and nitrogen inlet. The resulting polyisocyanate crosslinker (Part B) was stored under nitrogen in a dark and dry place until further use.

TABLE 2

| Formulation of 2K WB polyurethane coating | | |
|---|---|---|
| Part A | | |
| Pos.1 | Bayhydrol A145 | 83.7 |
| Pos.2 | Edaplan 490 | 5.9 |
| Pos.3 | Butylglycol | 7.2 |
| Pos.4 | De-ionized Water | 11.4 |
| Pos.5 | Silwet L-7210 polysiloxane | 0.6 |
| Pos.6 | $TiO_2$, TiPure R902+ | 126.8 |
| Pos.7 | Bentonite EV | 2.4 |
| Pos.8 | De-ionized Water | 12.0 |
| Pos.9 | Bayhydrol A145 | 210.4 |
| Pos.10 | Butyl glycol | 11.5 |
| Pos.11 | De-ionized. Water | 26.5 |
| Pos.12 | CoatOSil 7001 polysiloxane | 0.2 |
| Pos.13 | CoatOSil 2812 polysiloxane | 0.2 |
| Pos.14 | Tinuvin 292 | 1.1 |
| | TOTAL Part A | 500.0 |
| Part B | | |
| Pos.15 | Desmodur 3900 | 51.0 |
| Pos.16 | Butylglycolacetate | 29.8 |
| Pos.17 | Ethyl-3-ethoxypropionate | 4.3 |
| | TOTAL Part B | 85.0 |

2K water-based polyurethane antigraffiti coatings were prepared by cold blending of the white topcoat material (Table 2, Part A) with various antigraffiti additives listed in the table 3. Antigraffiti additives were used at 2 wt.-% concentration (calculated on 100% solids of the antigraffiti additive) based on total ready-to-use formula (paint with activator). After mixing for 1-72 h, white topcoats were activated with the aliphatic polyisocyanate crosslinker (Table 2, Part B). After mixing paint with the activator for 5 minutes at 150-300 rpm, the resulting paint systems were transferred into the pneumatic, conventional, manual, gravity feed spray-gun, equipped with a 1.6 mm spray nozzle. Spray pressure was adjusted to 2.0-2.5 bar. Wet film builds of the coating systems were controlled with the lab wet film gauge. The topcoat systems were sprayed over cold rolled steel substrate panels (Gardobond HDG7 OE). Before spraying, substrate panels were cleaned with a paper cloth immersed in xylene and then with a paper cloth immersed in isopropyl alcohol. After spraying liquid coating films were cured for 14 days at room temperature (50% RH). Dry film thickness of the coating systems was set at 75-80 microns.

TABLE 3

| 2K WB (water based) polyurethane antigraffiti coatings | |
|---|---|
| Antigraffiti additive | Example of water-based WB antigraffiti polyurethane coating |
| no additive | 2K WB PUR 1 |
| CoatOSil 2812 polysiloxane-polyether, block-copolymer | 2K WB PUR 2 |
| AEAFP-2(inventive) | 2K WB PUR 3 |
| em1-AEAFP-2(inventive) | 2K WB PUR 4 |

Example 7 Test Methods

Evaluation of mechanical, chemical and physical properties of the experimental coating systems was conducted using the following test methods and procedures: (i) Cross-hatch adhesion in accordance with EN ISO 2409; Wet cross-hatch adhesion was measured after conditioning of the test specimens in condensed water humidity chamber in accordance with DIN EN ISO 6270-2; (ii) Cylindrical mandrel bending test in accordance with DIN EN ISO 6860; (iii) Direct and reverse impact test with in accordance with DIN EN ISO 6272; (iv) Chemical resistance test was carried out using 0.5 M solution of sulfuric acid. In the test experimental coating film was exposed to 30, 60 and 90 minutes etching by the sulfuric acid solution (one droplet) at 50° C. After exposure the droplet was removed, the test surface was rinsed with demineralized water and inspected for defects. The test rating score was assigned as follows: R10—no visible etching marks; R9—small marks, no relief to feel with fingertip; R8—marks, relief to feel; R6—marks, matt white shiny spots (hazy); R4—starting deterioration, white spots, clear damage to the coating; R2—blister raise; R0—coating delamination. The final rating score was calculated as an aggregate ΣR of 30, 60 and 90 min; (v) Contact angle measurements were carried out on Kruss instrument with water and diiodomethane; (vi) Gloss was measured in accordance with DIN EN ISO 2813; (vii) QUV-B accelerated weatherability test in accordance with ASTM G-154; (viii) Erichsen cupping in accordance with DIN 50101. (ix) To investigate antigraffiti performance the test specimen was coated with graffiti nitrocellulose paints from spraycans (4 colors were utilized: blue, red, green and black). Afterwards sprayed graffiti paints were dried at room temperature. Test of release properties was conducted by rubbing adhesive tape (Tesa 4651) onto the surface of the test panel and then by gentle pulling of adhesive tape. Test were conducted after 1 h, 24 h and 240 h after the application of graffiti paint. Antigraffiti performance was evaluated based on how much graffiti paint was removed from the test surface. To rate antigraffiti performance, the following scores were utilized: 3—full removal of paint; 2—partial (≥50%) removal of paint; 1—slight removal of paint (550%); 0—no removal of paint. Appearance of the coating systems was evaluated visually. (x) Characterization of coating film thickness was accomplished in accordance with general principles of DIN EN ISO 2808:2019-12 norm.

Example 8: Investigation of Solvent-Based (SB) Polyurethane Antigraffiti Coatings Results of the test investigation of 2K solvent-based (SB) polyurethane (PUR) white topcoats modified with various antigraffiti additives are summarized in Table 4.

TABLE 4

Results of investigation of various solvent-based antigraffiti polyurethane coatings

| | Test: | | | |
|---|---|---|---|---|
| | 2K SB PUR 1 no additive | 2K SB PUR 2 CoatOSil 2812 copolymer | 2K SB PUR 3 AEAFP-1 (comparative) | 2K SB PUR 4 AEAFP-2 (inventive) |
| Gloss (20'; 60') | 86; 93 | 72; 89 | 70.3; 87.0 | 83.6; 92.1 |
| Cross-hatch adhesion dry | GT3-4 | GT5 | GT0 | GT0 |
| Cross-hatch adhesion wet | GT5 | GT5 | GT0-1 | GT 0-1 |
| Impact resistance direct (1 m; 2 KG) | failed | passed | passed | passed |
| Impact resistance reverse (1m; 2 KG) | failed | failed | passed | passed |
| acid-etch resistance | 23 | 25 | 25 | 25 |
| Erichsen cupping (mm) | >8 mm | >8 mm | >8 mm | >8 mm |
| WCA (water contact angle) | 83.3 | 88.9 | 92.5 | 93.0 |
| Antigraffiti performance | 0 | 2 | 2 | 3 |
| Gloss (20'; 60') after 1008 h QUV-B | 19.2; 60.8 | 18.2; 65.2 | 59.1; 80.4 | 66.0; 84.4 |
| WCA (water contact angle) after 1008 QUV-B | 55.2 | 49.6 | 77.9 | 92.3 |
| Antigraffiti performance after 1008 h QUV-B | 0 | 0 | 1 | 3 |

Results from the experimental evaluation demonstrate that silicone aspartic structure AEAFP-2 from Example 2 has significant improvements in antigraffiti performances compared to the polysiloxane aspartic structure of example 1. In particular, modification of solvent-based polyurethane paint with AEAFP-2 additive provide coating systems with more efficient and durable release, antigraffiti effect.

Example 9: Investigation of Water-Based (WB) Polyurethane (PUR) Antigraffiti Coatings Results of the test investigation of 2K water-based polyurethane white topcoats modified with various antigraffiti additives are summarized in Table 5.

TABLE 5

Results of investigation of various water-based antigraffiti polyurethane coatings

| | Test: | | | |
|---|---|---|---|---|
| Additive | 2K WB PUR 1 no additive | 2K WB PUR 2 CoatOSil 2812 copolymer | 2K WB PUR 3 AEAFP-2 (inventive) | 2K SB PUR 4 em1-AEAFP-2 (inventive) |
| Gloss (20'; 60') | 70.7; 84.1 | 71.3; 85.8 | 72.9; 87.1 | 76.0; 87.4 |
| Appearance | smooth, wet-look | smooth, wet-look | orange-peel with craters | smooth, wet-look |
| Cross-hatch adhesion dry | GT5 | GT0 | GT0 | GT0 |
| Cross-hatch adhesion wet | GT5 | GT5 | GT 2-3 | GT5 |
| Impact resistance direct (1 m; 2 KG) | passed | passed | passed | passed |
| Impact resistance reverse (1 m; 2 KG) | failed | passed | passed | passed |
| acid-etch resistance | 14 | 6 | 14 | 12 |
| Erichsen cupping (mm) | >8 mm | >8 mm | >8 mm | >8 mm |
| WCA (water contact angle) | 85.6 | 87.9 | 95.3 | 93.0 |
| Antigraffiti performance | 0 | 3 | 3 | 3 |
| Gloss (20'; 60') after 504 h QUV-B | 57.5; 80.3 | 51.9; 80.1 | 56.9; 79.9 | 55.4; 78.8 |
| WCA (water contact angle) after 504 h QUV-B | 73.2 | 72.2 | 94.7 | 93.0 |
| Antigraffiti performance after 504 h QUV-B | 0 | 0 | 2 | 2 |

Results from the experimental evaluation demonstrate that emulsion form of silicone aspartic structure emi-AEAFP-2 from Example 3 has significant improvements in compatibility with water-reducible polymers compared to the polysiloxane aspartic structure of example 2. In particular, modification of water-based polyurethane paint with emi-AEAFP-2 additive provide coating systems with better flow and levelling, crater-free and orange-peel free coating systems.

Example 10

Step 1

Into a 500 ml flask equipped with a heating mantle, a J-KEM, mechanical stirrer, dropping funnel and cold-water condenser, was charged 179.3 g gamma-Aminopropyltrimethoxysilane (A-1110 from Momentive). Then under stirring at RT, 189.2 g Diethyl Maleate (97% from Aldrich) was added dropwise to the flask from the dropping funnel. After addition was completed, the reaction was heated to 80° C. and the reaction was allowed to continue for 5 hours. The reaction was allowed to cool to RT, and an aspartic acid ester functionalized silane was obtained.

Step 2

On the next step, into a one-liter flask equipped with a J-KEM, stir bar, and cold-finger reflux distillation unit, was charged 475 g silanol-terminated polydimethylsiloxane (1.0 mol from Momentive containing 7.15% —OH group), 142 g gamma-glycidoxypropyltrimethoxysilane (A-187 from Momentive), 221 g of the silane obtained from step 1, and 0.5 g DBU (1,8-Diazabicyclo-[5.4.0]-undec-7-ene from Aldrich). Under stirring, the flask was heated to around 90° C. to kick start the reaction as evidenced by foaming or refluxing. After steady refluxing, Methanol was collected in the receiver. When no additional methanol was distilling out, vacuum was applied to remove additional volatiles, gradually reaching maximum vacuum until no more material was collected. The product, an epoxy and aspartic acid ester-functional polysiloxane remained in the reaction flask. A stable emulsion of the epoxy and aspartic acid ester-functional polysiloxane was also prepared in the same manner as described in Example 4.

Example 11

Into a one-liter flask equipped with a heating mantle, a J-KEM, mechanical stirrer, dropping funnel and a cold-water condenser, was charged 500 g AEAFP-2 (sample prepared in Inventive Example 2). Then under stirring at RT, 88.7 g gamma-isocyanatopropyltrimethoxysilane (A-Link-35 from Momentive) was added dropwise from the dropping funnel. After addition was completed, the reaction was stirred at RT for 2 more hours resulting in the product of example 11.

The invention claimed is:

1. A polyorganosiloxane (I) comprising at least one unit of the formula (A):

(A)

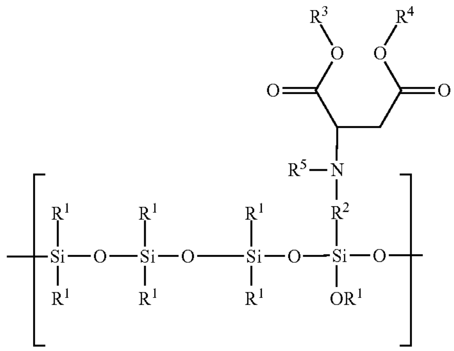

and at least one unit of the formula (B):

(B)

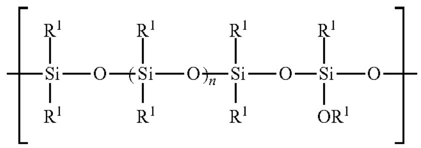

and wherein the terminal units of said polyorganosiloxane are selected of the formulas (C) and (D):

(C)

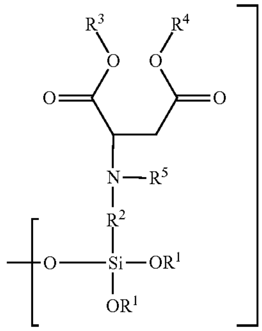

and (D)

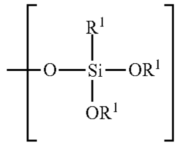

these units (A) to (D) being connected to each other in such a way that Si—O—Si bonds are formed between them, wherein each n is an average number of about 1 to 250, each $R^1$ is independently selected from organic groups, and $R^1$ optionally have substituent functional groups selected from the group consisting of epoxy groups, alkenyl groups, acrylate groups, mercapto groups, and poly (C2-C4)-alkylene ethers with up to 500 alkylene oxy units, and $R^1$ can be a polyorganosiloxanyl residue comprising at least one siloxy unit selected from the group consisting of $R_3SiO_{1/2}$, $R_2SiO_2$, $RSiO_{3/2}$ and $SiO_{4/2}$, wherein R is an organic group, each $R^2$ is -independently selected from the group consisting of a straight chain alkylene group having from 1 to 10 carbon atoms, branched chain alkylene group having from 3 to 10 carbon atoms, a cycloalkylene group having from 3 to 10 carbon atoms, an arylene group having from 6 to 12 carbon atoms, an aralkylene group having from 7 to 10 carbon atoms and an arenylene group having from 7 to 10 carbon atoms, each $R^3$ and $R^4$ is independently selected from the group consisting of a straight chain alkyl group of from 1 to 10 carbon atoms, a branched chain alkyl group having from 3 to 10 carbon atoms and a cycloalkyl group having from 3 to 10 carbon atoms, and $R^5$ is selected from the group consisting of hydrogen, and a group of the formula:

$$—R^6—Si(OR_1)_x(R)_{3-x}{}^1$$

wherein x is 1 to 3, each $R^1$ is independently selected from organic groups as defined above, and $R^6$ is an alkylene group which is bond via carbon atoms to the silicon atom and the nitrogen atom, and which can be substituted by oxygen (to form a carbonyl group) or in which one or more carbon atoms can be replaced by one or more of the group consisting of —O—, —S—, —NH— and —$NR^7$—, wherein $R^7$ represents an alkyl group.

2. The polyorganosiloxane (I) according to claim 1, wherein $R^5$ is hydrogen.

3. A polyorganosiloxane (I) according to claim 1, comprising at least one unit of the formula (A):

(A)

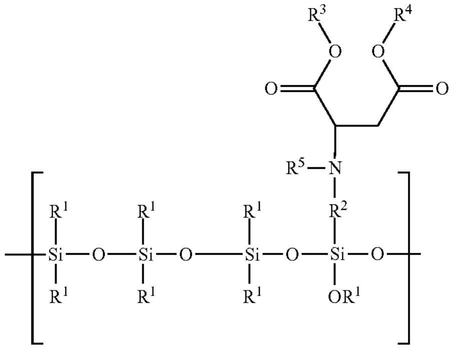

and at least one unit of the formula (E):

(E)

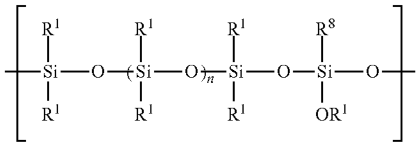

and wherein the terminal units of said polyorganosiloxane are selected of the formulas (C) and (F):

(C)

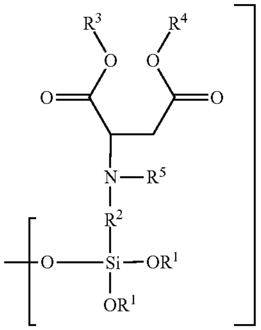

and (F)

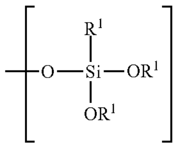

these units (A), (C), (E) and (F) being connected to each other in such a way that Si—O—Si bonds are formed between them, wherein $R^8$ is selected from groups $R^1$ with the proviso that at least one of $R^8$ represents an epoxy functional group.

4. The polyorganosiloxane (I) according to claim 3, comprising at least one unit of the formula (A):

(A)

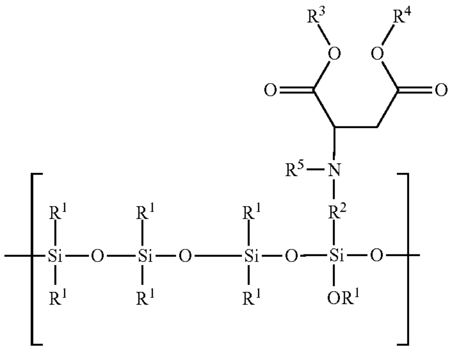

and at least one unit of the formula (G):

(G)

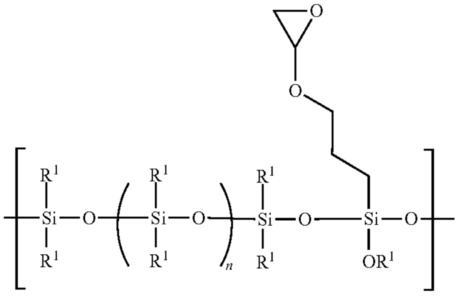

and wherein the terminal units of said polyorganosiloxane are selected from the formulas (C) and (H):

(C)

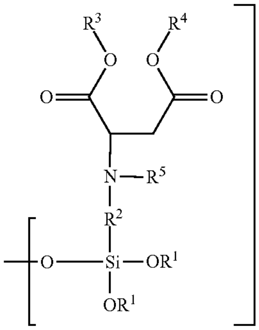

and (H)

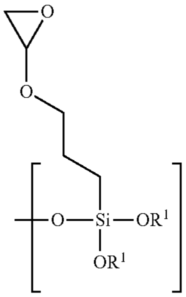

these units (A), (C), (G) and (H) being connected to each other in such a way that Si—O—Si bonds are formed between them.

5. The polyorganosiloxane (I) according to claim 4, wherein $R^5$ is hydrogen.

6. The polyorganosiloxane (I) according to claim 1, comprising at least one group of the formula:

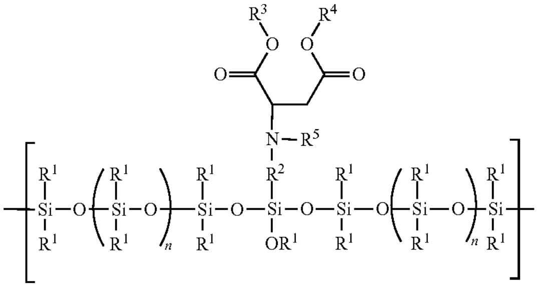

and

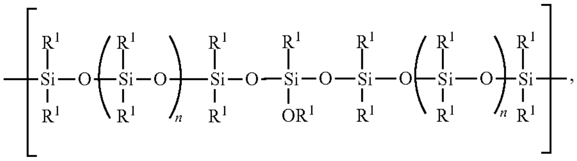

at least one internal group selected from:

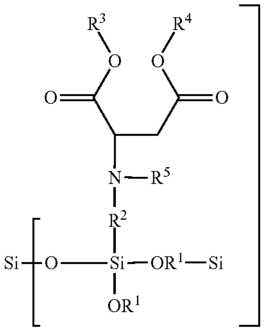

and at least one group of the formula

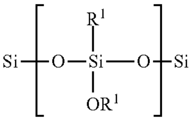

wherein the bonds of the terminal silicon atoms are not shown.

7. The polyorganosiloxane (I) according to claim 6, wherein $R^5$ is hydrogen.

8. The polyorganosiloxane (I) according to claim 3, comprising at least one group of the formula:

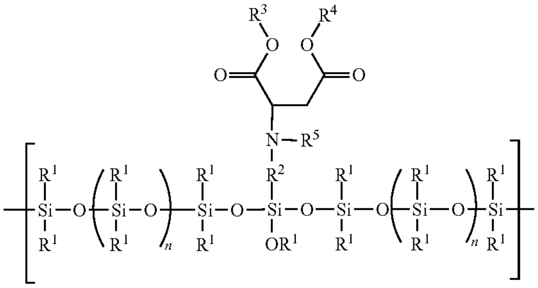

and

-continued

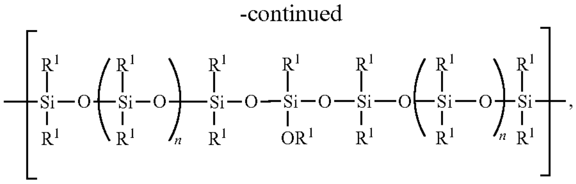

at least one internal group selected from:

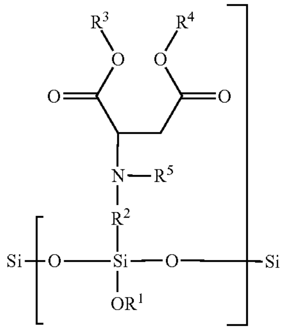

and at least one group of the formula

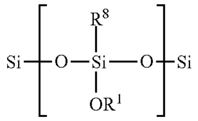

wherein the bonds of the terminal silicon atoms are not shown.

9. The polyorganosiloxane (I) according to claim 8, wherein $R^5$ is hydrogen.

10. The polyorganosiloxane (I) according to claim 4, wherein units (A), (B), (E) and (G) are randomly distributed.

11. The polyorganosiloxane (I) according to claim 4, wherein the total average number of the units (A) and (B) or (A) and (E) or (A) and (G) in the polyorganosiloxane (I) is from 1 to 10.

12. The polyorganosiloxane (I) according to claim 4, wherein the molar ratio of the units (A) and (B) or (A) and (E) or (A) and (G) in the polyorganosiloxane (I) is from about 1:20 to about 20:1.

13. The polyorganosiloxane (I) according to claim 4, wherein the average number of units (A) is from about 0 to about 10, and the average number of the units (B) or (E) or (G) is from about 0 to about 10.

14. The polyorganosiloxane (I) according to claim 1, wherein the molar percentages of the units (A) to (H), or (A) to (D) in the polyorganosiloxane (I) are: about 25 to about 45% (A):

(A)

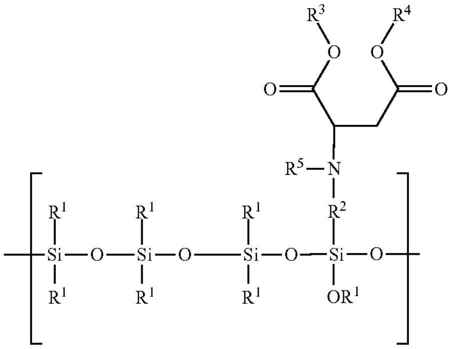

about 8 to about 28% (B):

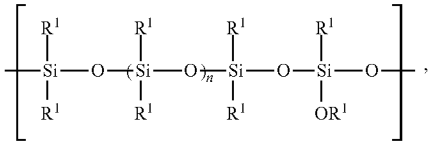

or about 8 to about 28% (E):

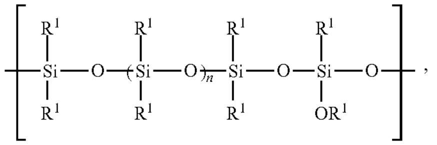

or about 8 to about 28% (G):

(G)

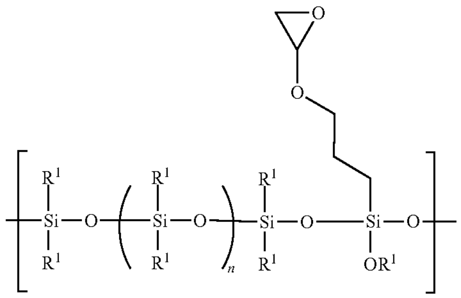

about 3 to 23% (C):

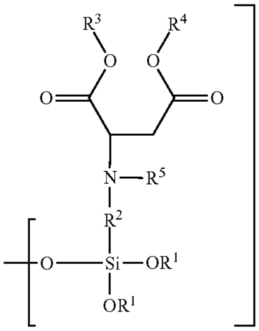

(C)

and about 20 to 45% (D):

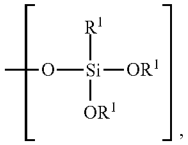

or about 20 to 45% (F)

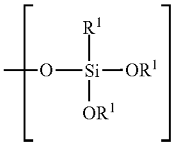

(F)

or about 20 to 45% (H):

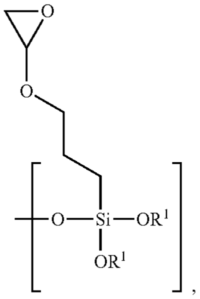

based on 100 mol-% of the sum of the molar percentages for (A) to (H) or (A) to (D).

15. The polyorganosiloxane (I) according to claim 1, wherein $R^1$ is methyl.

16. The polyorganosiloxane (I) according to claim 3, wherein the epoxy-functional group of $R^8$ is an alkyl group optionally comprising one or more —O— (oxygen) and one or more epoxy group of the formula:

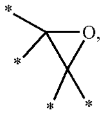

wherein the asterisks each denote a single bond to hydrogen or to the alkyl group.

17. The polyorganosiloxane (I) according to claim 1, which has the average formula:

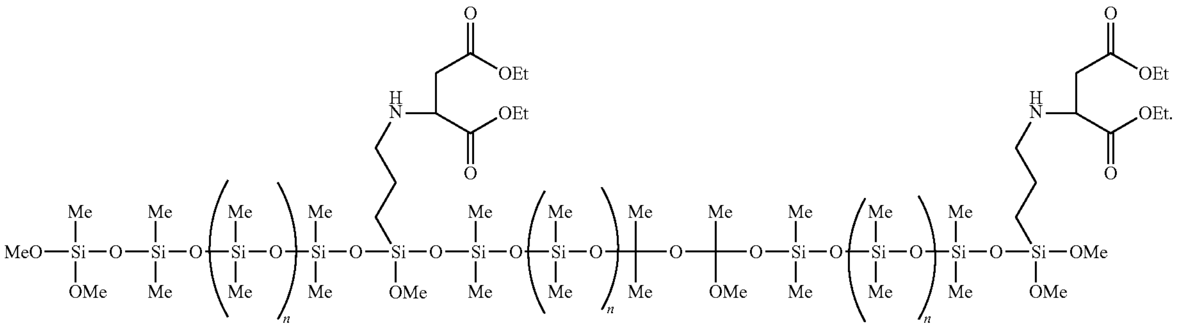

18. The polyorganosiloxane (I) according to claim 1, which comprises at least two of the compounds selected from the following average formulas:
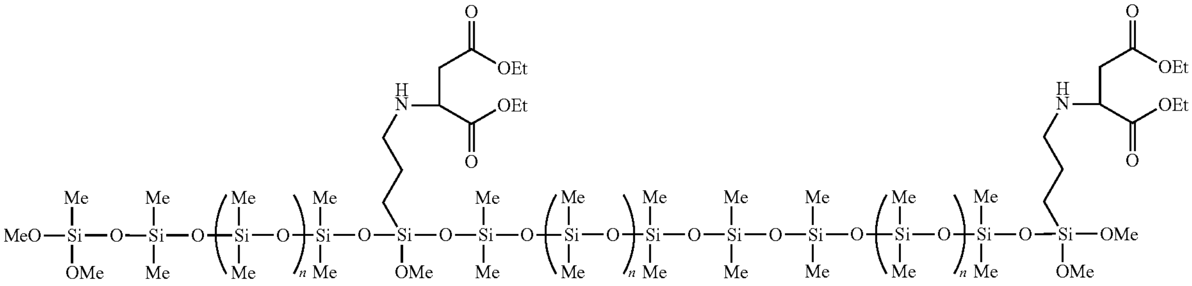
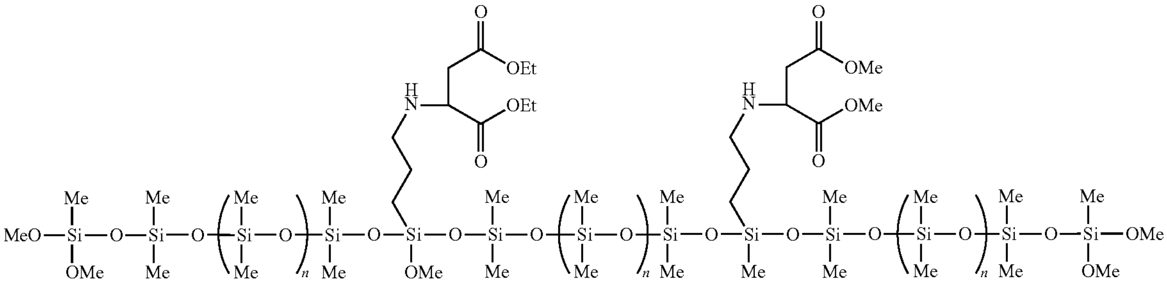
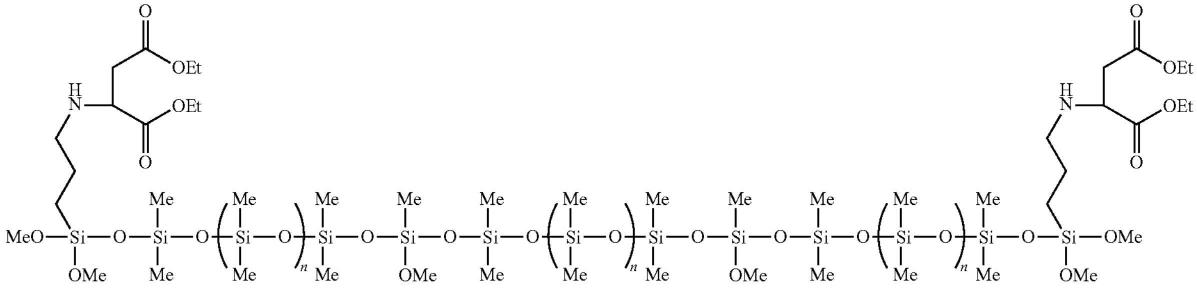
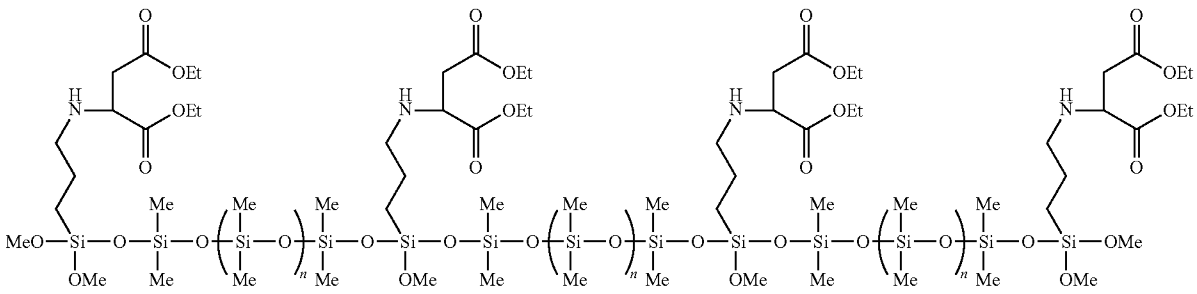
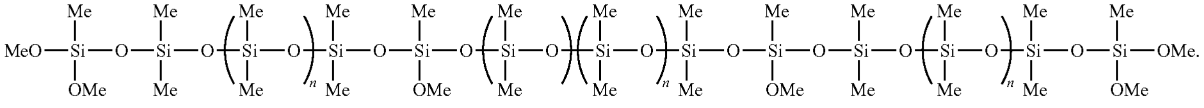

19. A process for the manufacture of the polyorganosiloxane (I) according to claim 1, which comprises the steps of (i) reacting a silane of formula (a)

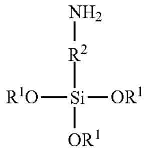

and a silane of the formula (b)

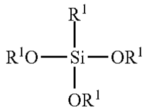

with a silanol of the formula (c):

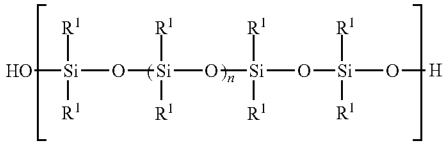

to form a polyorganosiloxane (II) comprising at least one unit of the formula ($A^1$):

($A^1$)

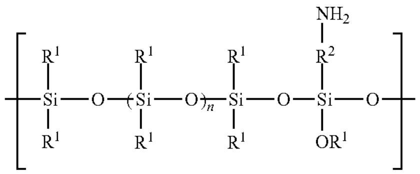

and at least one unit of the formula (B):

(B)

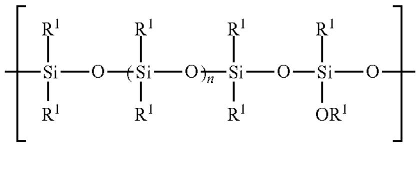

and wherein the terminal units of said polyorganosiloxane (II) are selected from the formulas ($C^1$) and (D):

($C^1$)

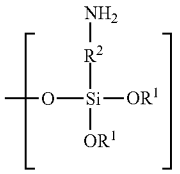

and (D)

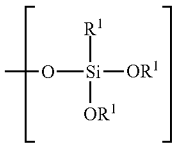

wherein $R^1$, $R^2$ and n are each as defined above, these units (A) to (D) being connected to each other in such a way that Si—O—Si bonds are formed between them, (ii) reacting the polyorganosiloxane (II) obtained in step (i) with a compound of the formula

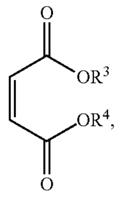

wherein $R^3$ and $R^4$ are each as defined above, to obtain a polyorganosiloxane (I) as defined above.

20. A process according to claim 19, which further comprises the step of the reaction with an isocyanate-functional alkoxy silane, to introduce a group $R^5$ different from hydrogen.

* * * * *